United States Patent
Song

(10) Patent No.: US 9,397,942 B2
(45) Date of Patent: Jul. 19, 2016

(54) PACKET FORWARDING

(71) Applicant: Hangzhou H3C Technologies Co., Ltd., Hangzhou (CN)

(72) Inventor: Yubing Song, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/405,367

(22) PCT Filed: Sep. 2, 2013

(86) PCT No.: PCT/CN2013/082788
§ 371 (c)(1),
(2) Date: Dec. 3, 2014

(87) PCT Pub. No.: WO2014/032624
PCT Pub. Date: Mar. 6, 2014

(65) Prior Publication Data
US 2015/0172190 A1    Jun. 18, 2015

(30) Foreign Application Priority Data

Aug. 31, 2012 (CN) .......................... 2012 1 0318996
Apr. 9, 2013 (CN) .......................... 2013 1 0121091
Apr. 9, 2013 (CN) .......................... 2013 1 0121231
Apr. 9, 2013 (CN) .......................... 2013 1 0121235

(51) Int. Cl.
*H04L 12/50* (2006.01)
*H04Q 11/00* (2006.01)
(Continued)

(52) U.S. Cl.
CPC .......... *H04L 45/745* (2013.01); *G06F 9/45558* (2013.01); *H04L 12/1886* (2013.01);
(Continued)

(58) Field of Classification Search
CPC ....... H04L 45/66; H04L 45/34; H04L 45/505; H04L 45/306; H04L 45/123
See application file for complete search history.

(56) References Cited

U.S. PATENT DOCUMENTS 7,908,338 B2    3/2011  Ogasawara
8,724,629 B1 *  5/2014  Goli .................... H04L 12/4625
                                                    370/392
(Continued)

FOREIGN PATENT DOCUMENTS

CN    1507754    6/2004
CN    1528080    9/2004
(Continued)

OTHER PUBLICATIONS

US Office Action dated Dec. 1, 2015, U.S. Appl. No. 14/405,370 dated Dec. 3, 2014, United States Patent and Trademark Office.
(Continued)

*Primary Examiner* — Faruk Hamza
*Assistant Examiner* — Abu-Sayeed Haque
(74) *Attorney, Agent, or Firm* — Hewlett Packard Enterprise Patent Department

(57) ABSTRACT

According to an example, to forward a packet, an access layer device searches a Layer 2 forwarding table according to a source Media Access Control (MAC) address of the packet, and replaces the source MAC address with a mapped virtual MAC address in a matching Layer 2 forwarding entry. The Layer 2 forwarding table is searched according to a destination MAC address of the Ethernet packet. In response to determining that a Layer 2 forwarding entry matching the destination MAC address of the Ethernet packet does not include a MAC address mapped to the destination MAC address, Very Large Layer 2 (VLL2) network protocol encapsulation is performed on the Ethernet packet of which the source MAC address is replaced according to an egress port in the Layer 2 forwarding entry matching the destination MAC address; and the Ethernet packet encapsulated with a VLL2 network protocol header is sent via the egress port.

20 Claims, 9 Drawing Sheets

(51) Int. Cl.
  *H04L 12/28*  (2006.01)
  *H04L 12/56*  (2006.01)
  *H04L 12/741*  (2013.01)
  *H04L 12/46*  (2006.01)
  *H04L 29/12*  (2006.01)
  *G06F 9/455*  (2006.01)
  *H04L 12/18*  (2006.01)
  *H04L 12/715*  (2013.01)
  *H04L 12/723*  (2013.01)
  *H04L 12/721*  (2013.01)
  *H04L 12/14*  (2006.01)

(52) U.S. Cl.
  CPC ........ *H04L 12/4633* (2013.01); *H04L 12/4641* (2013.01); *H04L 45/12* (2013.01); *H04L 45/66* (2013.01); *H04L 45/72* (2013.01); *H04L 61/103* (2013.01); *H04L 61/6022* (2013.01); *G06F 2009/4557* (2013.01); *G06F 2009/45595* (2013.01); *H04L 12/1485* (2013.01); *H04L 45/04* (2013.01); *H04L 45/34* (2013.01); *H04L 45/505* (2013.01)

(56) References Cited

U.S. PATENT DOCUMENTS

| | | | |
|---|---|---|---|
| 2001/0005675 | A1 | 6/2001 | Aho |
| 2004/0081161 | A1 | 4/2004 | Held et al. |
| 2007/0162594 | A1 | 7/2007 | Henry et al. |
| 2007/0191042 | A1 | 8/2007 | Chung et al. |
| 2008/0080535 | A1 | 4/2008 | Li et al. |
| 2008/0186965 | A1 | 8/2008 | Zheng |
| 2009/0288084 | A1 | 11/2009 | Astete |
| 2009/0303884 | A1 | 12/2009 | Kimura |
| 2009/0327462 | A1 | 12/2009 | Adams |
| 2010/0091732 | A1* | 4/2010 | Roeder ............. H04W 36/0033 370/331 |
| 2010/0110975 | A1 | 5/2010 | Cagenius |
| 2010/0153701 | A1 | 6/2010 | Shenoy et al. |
| 2010/0257269 | A1* | 10/2010 | Clark .................... G06F 9/4856 709/226 |
| 2010/0290391 | A1 | 11/2010 | Cheng et al. |
| 2013/0343386 | A1* | 12/2013 | Sankar .................... H04L 47/41 370/392 |
| 2013/0346531 | A1 | 12/2013 | Hummel |
| 2014/0016501 | A1* | 1/2014 | Kamath .................. H04L 69/22 370/253 |

FOREIGN PATENT DOCUMENTS

| | | |
|---|---|---|
| CN | 1581819 | 2/2005 |
| CN | 1852253 | 10/2006 |
| CN | 1852330 | 10/2006 |
| CN | 1859222 | 11/2006 |
| CN | 101075933 | 11/2007 |
| CN | 101127696 | 2/2008 |
| CN | 101155136 | 4/2008 |
| CN | 101170490 | 4/2008 |
| CN | 101213817 | 7/2008 |
| CN | 101262417 | 9/2008 |
| CN | 101422010 | 4/2009 |
| CN | 101521631 | 9/2009 |
| CN | 101557341 | 10/2009 |
| CN | 101616094 | 12/2009 |
| CN | 101626338 | 1/2010 |
| CN | 102025796 | 4/2011 |
| CN | 102404179 | 4/2012 |
| CN | 102461073 | 5/2012 |
| CN | 103227757 | 7/2013 |
| CN | 103227843 | 7/2013 |
| CN | 103259727 | 8/2013 |
| EP | 2053834 A1 | 4/2009 |
| EP | 2216718 | 8/2010 |
| WO | WO-2011118586 | 9/2011 |
| WO | WO-2012/006190 A1 | 1/2012 |

OTHER PUBLICATIONS

International Search Report and Written Opinion dated Dec. 12, 2013 issued on PCT Patent Application No. PCT/CN2013/082788 dated Sep. 2, 2013, The State Intellectual Property Office, P.R. China.
International Search Report and Written Opinion dated Dec. 5, 2013 issued on PCT Patent Application No. PCT/CN 2013/082781 dated Sep. 2, 2013, The State Intellectual Property Office, P.R . China.
International Search Report and Written Opinion dated Dec. 5, 2013 issued on PCT Patent Application No. PCT/CN2013/082771 dated Sep. 2, 2013, The State Intellectual Property Office, P.R. China.
Extended European Search Report, EP Application No. 13833309.1, Date: Apr. 15, 2016, pp. 1-11.
Extended European Search Report, EP Application No. 13832405.8, Date: Mar. 17, 2016, pp. 1-10.
Vijay Mann et al., "Identity: A data center network fabric to enable co-existence of identical addresses," COMSNET 2012, Date: Jan. 3, 2012, pp. 1-10, IEEE.
Vijay Mann et al, "CrossRoads: Seamless VM Mobility across Data Centers through Software Defined Networking," NOMS 2012, Date: Apr. 2012, pp. 88-96, IEEE.

* cited by examiner

PACKET FORWARDING

CLAIM FOR PRIORITY

The present application is a national stage filing under 35 U.S.C. 371 of PCT application number PCT/CN2013/082788, having an international filing date of Sep. 2, 2013, which claims priority to Chinese patent application number 201210318996.1 having a filing date of Aug. 31, 2012, to Chinese patent application number 201310121091.X having a filing date of Apr. 9, 2013, to Chinese patent application number 201310121235.1 having a filing date of Apr. 9, 2013, and to Chinese patent application number 201310121231.3 having a filing date of Apr. 9, 2013 the disclosures of which are hereby incorporated by reference in their entireties.

BACKGROUND

There may be dozens or even hundreds of Virtual Machines (VMs) that are hosted on an individual physical server by employing the server virtualization technology, so that the utilization of the server is improved. In order to enhance the high availability of the server, VMs may be migrated between different ports of an access layer device or migrated between different access layer devices. Different standards organizations have developed different standardized protocols, such as the Transparent Interconnection of Lots of Links (Trill) protocol, the Shortest Path Bridging (SPB) protocol, etc., which can be used to build a Very Large Layer 2 (VLL2) network to achieve the migration of VMs.

Taking a VLL2 network including a plurality of Data Centers (DCs) as an example, the VLL2 networking technologies include VLL2 network technologies within a DC and VLL2 network technologies interconnecting DCs. The former can achieve the VM migration between different ports of an individual access layer device and the VM migration between different access layer devices within an individual DC. The later can achieve the VM migration between access layer devices belonging to different DCs.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
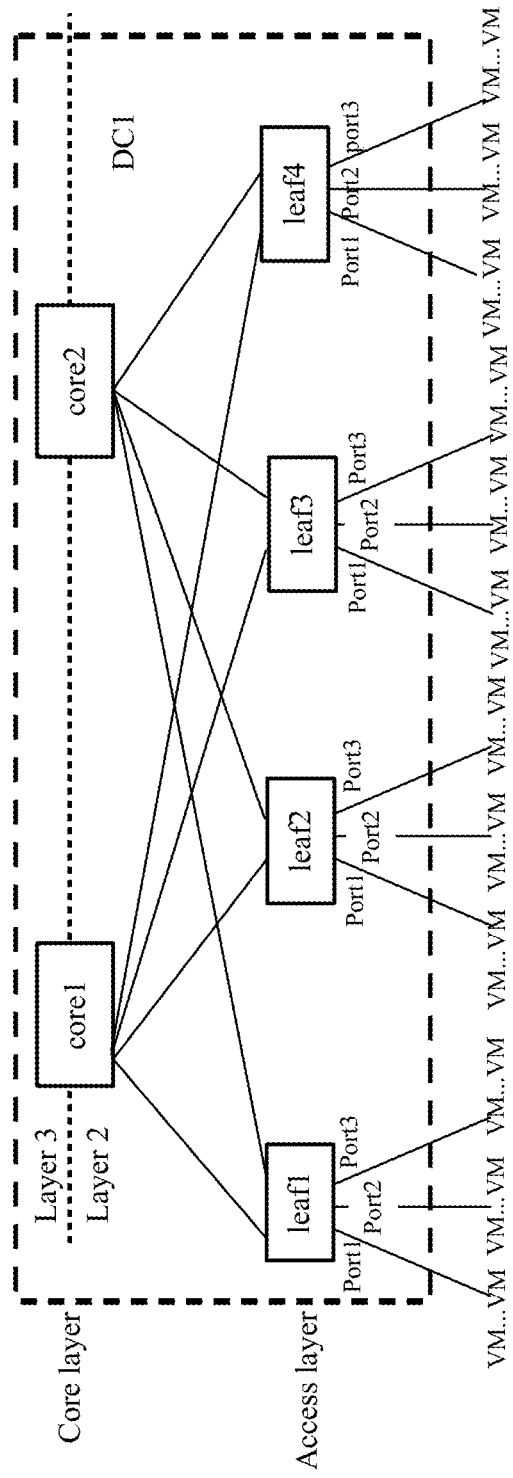
FIG. 1 is a schematic diagram illustrating a Trill network according to an example of the present disclosure.

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

An access layer device connects computers to a network. The computers may include end user devices, servers or any type of computer that may include a network interface to connect to the network. For example, an access layer device can connect a physical server hosting a VM to a core layer device. Also, Virtual Local Area Networks (VLANs) may be used to separate traffic in an access layer in the network. An access layer device may include a network switch. The network switch may be layer 2, layer 3 or layer 2/3, where the layers refer to layers in the Open Systems Interconnection (OSI) model. Core layer devices may include network switches for backbone switching and routing and also may include layer 2, layer 3 or layer 2/3 network switches. A layer 2/3 network switch may perform Layer 2 switching and Layer 3 routing. The access layer devices in a VLL2 network within a DC may together provide a large number of ports, for example more than 12,000 10-Gigabit Ethernet ports for connecting 12,000 10-Gigabit physical servers. In some cases more than 200 VMs may be hosted on an individual 10-Gigabit physical server. In some cases the VMs may be large, e.g. more than 2.4 megabytes (M) each, and when many VMs are hosted on 12,000 10-Gigabit physical servers of a VLL2 network within a DC, this can leads to the number of Media Access Control (MAC) addresses used by the VMs in the VLL2 network within an individual DC being very large, e.g. up to 2.4 million. The number of VMs within a DC based on a multi-tenant model is even greater, and even more MAC addresses are used. A DC may include a group of networked computer systems, which may include servers, that are housed at a facility. The computer systems are connected via a network in the DC and may host VMs, and the DC may be connected to other DCs via a network. The DC may include support systems such as redundant or backup power supplies, redundant data communications connections, environmental controls, security devices, etc.

Accordingly, in the VLL2 network within the DC, an access layer device learns a large number of MAC addresses in a Layer 2 forwarding table to perform forwarding.

Examples of the present disclosure do not limit what VLL2 network technologies are used within a DC or between DCs. VLL2 network technologies like Trill, SPB, etc., may be employed within an individual DC. VLL2 network technologies like the MAC over IP (e.g., Overlay Transport Virtualization, OTV) protocol, the Ethernet Virtualization Interconnection (EVI) protocol, the Virtual Private LAN Service (VPLS) protocol, etc., may be applied to the interconnection of DCs.

By way of example, the present disclosure describes the architecture of a VLL2 network formed by the interconnection of four DCs but more or less DCs may be interconnected in the architecture. The VLL2 network also includes a network management apparatus (i.e., a network management plane) connected to the four DCs, and a server management apparatus (i.e., a VM management apparatus or a VM management plane). In the architecture, a VLL2 network within each DC employs the Trill technology, and a VLL2 network among DCs employs the MAC over IP technology.

FIG. 1 is a schematic diagram illustrating the architecture of a VLL2 network within Dc1 built with the Trill technology. The architecture of the VLL2 networks within other DCs is similar to that of the VLL2 network within DC1 shown in FIG. 1.

As shown in FIG. 1, the VLL2 network within DC1 includes a core layer and an access layer. Leaf1, leaf2, leaf3 and leaf4 are access layer devices. Core1 and core2 are core layer devices.

The Trill protocol is run on leaf1, leaf2, leaf3 and leaf4 which are in the access layer of DC1 and the Trill protocol is also run on core1 and core2 which are in the core layer of DC1. These devices running the Trill protocol are called Routing Bridges (RBridges). The RBridges together form a Trill network. RBridges obtain Trill network topologies between each other through a link state protocol. Each RBridge generates a routing forwarding table (referred to as a Trill routing table) from itself to another RBridge in the Trill network using the Shortest Path Tree algorithm.

In the example of the present disclosure, the network management apparatus configures a virtual MAC address for each VM in each DC according to a virtual MAC encoding rule. The virtual MAC address may include fields, as specified below, that are different than a traditional MAC address (also referred to as actual MAC address) assigned to network interfaces for communications on the physical network segment. Each virtual MAC address is a binary number of 6 bytes, and includes identifiers including:

a Uniqueness identifier (1 byte), which does not conflict with an existing assigned Organizationally Unique Identifier (OUI), and may use an identifier that is not assigned by the OUI, such as ED, 22, etc.;

a Data Center ID (1 byte), which is an identifier of a DC, also referred to as a network identifier;

a Device ID (2 bytes), which is an identifier of an access layer device; and a Host ID (2 bytes), which is an identifier of a VM or a host. Host IDs of VMs hosted on a plurality of physical servers which are connected to a same access layer device cannot be identical. Host IDs of VMs hosted on physical servers which are connected to different access layer devices can be identical. For example, if five physical servers are connected to switch1, then Host IDs of VMs hosted on the five physical servers cannot be identical. However, a Host ID of a VM hosted on a physical server connected to switch2 may be identical with a Host ID of a VM hosted on a physical server connected to switch1

Based on the above virtual MAC address encoding rule of the VM, several masks are defined in the example of the present disclosure, including:

a Host mask: ff-ff-ff-ff-ff-ff,
an access device mask: ff-ff-ff-ff-00-00, and
a data center mask: ff-ff-00-00-00-00.

The network management apparatus may configure virtual MAC addresses for VMs. Configuring may include determining the virtual MAC addresses. In some cases configuring may include sending the virtual MAC addresses to access layer devices. Also, as described below, the network management apparatus can configure entries in tables of devices, such as access devices or core devices etc. The configuring of entries may include determining information for the entries and sending the information to the devices for storage in the devices. The network management apparatus may configure the virtual MAC addresses in the whole network by running a batch configuration tool. During the process of configuring the virtual MAC addresses, the network management apparatus obtains from the VM management apparatus an information table including the VMs in the whole network and connections of physical devices. The virtual MAC addresses are added to the information table based on the information table and according to the above virtual MAC address encoding rule, and the information table is maintained. As shown in Table 1, the information table about the devices and the VMs in the whole network maintained by the network management apparatus at least include information as follows (configuration information of DC1 is shown in Table 1).

TABLE 1

| Device | Nickname | IP Address (MAC over IP) | Port | VLAN ID | IP address of VM | MAC address of VM | Virtual MAC address of VM | access device, mask-based, virtual MAC address | data center, mask-based, virtual MAC address |
|---|---|---|---|---|---|---|---|---|---|
| leaf1 | DC1_leaf1 | IP1 | Port1 | 1 | 1.1.1.1 | 00-11-11-11-11-11 | ED-01-00-01-00-01 | ED-01-00-01-00-00 | ED-01-00-00-00-00 |
| | DC1_leaf1 | IP1 | Port1 | 1 | 1.1.1.2 | 00-E0-FC-03-42-24 | ED-01-00-01-00-02 | | |
| | DC1_leaf1 | IP1 | Port1 | 1 | 1.1.1.3 | 00-14-2A-EB-74-2F | ED-01-00-01-00-03 | | |
| | DC1_leaf1 | IP1 | Port2 | 2 | 2.2.2.1 | 00-05-5B-A4-6B-28 | ED-01-00-01-00-04 | | |
| | DC1_leaf1 | IP1 | Port2 | 2 | 2.2.2.2 | 00-0f-e2-0f-9a-86 | ED-01-00-01-00-05 | | |
| | DC1_leaf1 | IP1 | Port2 | 2 | 2.2.2.3 | 00-0C-76-0A-17-2D | ED-01-00-01-00-06 | | |

TABLE 1-continued

| Device | Nickname | IP Address (MAC over IP) | Port | VLAN ID | IP address of VM | MAC address of VM | Virtual MAC address of VM | access device, mask-based, virtual MAC address | data center, mask-based, virtual MAC address |
|---|---|---|---|---|---|---|---|---|---|
|  | DC1_leaf1 | IP1 | Port3 | 3 | 3.3.3.1 | 00-0D-88-F6-44-C1 | ED-01-00-01-00-07 |  |  |
|  | DC1_leaf1 | IP1 | Port3 | 3 | 3.3.3.2 | 00-0D-88-F7-9F-7D | ED-01-00-01-00-08 |  |  |
|  | DC1_leaf1 | IP1 | Port3 | 3 | 3.3.3.3 | 00-0D-88-F7-B0-90 | ED-01-00-01-00-09 |  |  |
| leaf2 | DC1_leaf2 | IP1 | Port1 | 1 | 1.1.1.4 | 00-22-22-22-22-22 | ED-01-00-02-00-01 | ED-01-00-02-00-00 |  |
|  | DC1_leaf2 | IP1 | Port1 | 1 | 1.1.1.5 | 00-6B-28-07-44-3F | ED-01-00-02-00-02 |  |  |
|  | DC1_leaf2 | IP1 | Port1 | 1 | 1.1.1.6 | 00-14-3A-EB-84-2F | ED-01-00-02-00-03 |  |  |
|  | DC1_leaf2 | IP1 | Port2 | 2 | 2.2.2.4 | 00-05-6B-A4-6B-38 | ED-01-00-02-00-04 |  |  |
|  | DC1_leaf2 | IP1 | Port2 | 2 | 2.2.2.5 | 00-0D-88-F7-B0-94 | ED-01-00-02-00-05 |  |  |
|  | DC1_leaf2 | IP1 | Port2 | 2 | 2.2.2.6 | 00-0D-98-F8-4E-88 | ED-01-00-02-00-06 |  |  |
|  | DC1_leaf2 | IP1 | Port3 | 3 | 3.3.3.4 | 04-37-1A-44-55-66 | ED-01-00-02-00-07 |  |  |
|  | DC1_leaf2 | IP1 | Port3 | 3 | 3.3.3.5 | 06-22-23-AA-BB-CC | ED-01-00-02-00-08 |  |  |
|  | DC1_leaf2 | IP1 | Port3 | 3 | 3.3.3.6 | 08-53-26-3B-7C-FD | ED-01-00-02-00-09 |  |  |
| leaf3 | DC1_leaf 3 | IP1 | Port1 | 1 | 1.1.1.7 | 00-06-25-FD-32-EB | ED-01-00-03-00-01 | ED-01-00-03-00-00 |  |
|  | DC1_leaf 3 | IP1 | Port1 | 1 | 1.1.1.8 | 00-1D-A1-75-28-70 | ED-01-00-03-00-02 |  |  |
|  | DC1_leaf3 | IP1 | Port1 | 1 | 1.1.1.9 | 00-09-92-01-CA-D7 | ED-01-00-03-00-03 |  |  |
|  | DC1_leaf3 | IP1 | Port2 | 2 | 2.2.2.7 | 00-25-9C-2F-63-FE | ED-01-00-03-00-04 |  |  |
|  | DC1_leaf3 | IP1 | Port2 | 2 | 2.2.2.8 | FC-FB-FB-11-22-33 | ED-01-00-03-00-05 |  |  |
|  | DC1_leaf3 | IP1 | Port2 | 2 | 2.2.2.9 | F8-83-88-47-77-98 | ED-01-00-03-00-06 |  |  |
|  | DC1_leaf3 | IP1 | Port3 | 3 | 3.3.3.7 | 10-11-23-5A-8B-CF | ED-01-00-03-00-07 |  |  |
|  | DC1_leaf3 | IP1 | Port3 | 3 | 3.3.3.8 | 28-47-6c-66-77-88 | ED-01-00-03-00-08 |  |  |
|  | DC1_leaf3 | IP1 | Port3 | 3 | 3.3.3.9 | 3C-4B-5A-99-3D-57 | ED-01-00-03-00-09 |  |  |
| leaf4 | DC1_leaf4 | IP1 | Port1 | 1 | 1.1.1.10 | 20-47-FC-13-34-57 | ED-01-00-04-00-01 | ED-01-00-04-00-00 |  |
|  | DC1_leaf4 | IP1 | Port1 | 1 | 1.1.1.11 | FC-FB-FB-01-33-45 | ED-01-00-04-00-02 |  |  |
|  | DC1_leaf4 | IP1 | Port1 | 1 | 1.1.1.12 | 24-1A-8C-05-55-FF | ED-01-00-04-00-03 |  |  |
|  | DC1_leaf4 | IP1 | Port2 | 2 | 2.2.2.10 | 24-37-EF-AA-97-A8 | ED-01-00-04-00-04 |  |  |
|  | DC1_leaf4 | IP1 | Port2 | 2 | 2.2.2.11 | 00-00-01-17-4d-F9 | ED-01-00-04-00-05 |  |  |
|  | DC1_leaf4 | IP1 | Port2 | 2 | 2.2.2.12 | 00-E0-FC-37-45-98 | ED-01-00-04-00-06 |  |  |
|  | DC1_leaf4 | IP1 | Port3 | 3 | 3.3.3.10 | 58-66-BA-03-27-99 | ED-01-00-04-00-07 |  |  |
|  | DC1_leaf4 | IP1 | Port3 | 3 | 3.3.3.11 | C4-CA-D9-70-90-58 | ED-01-00-04-00-08 |  |  |
|  | DC1_leaf4 | IP1 | Port3 | 3 | 3.3.3.12 | 00-0D-EF-33-44-55 | ED-01-00-04-00-09 |  |  |
| core1 | DC1_core1 |  | L3 interface | 1 | 1.1.1.100 | 00-E0-FC-11-11-11 |  |  |  |
|  |  |  | L3 interface | 2 | 2.2.2.100 | 00-E0-FC-22-22-22 |  |  |  |
| core2 | DC1_core2 |  | L3 interface | 3 | 3.3.3.100 | 00-E0-FC-33-33-33 |  |  |  |

In Table 1, "Device" is an access layer device connecting a physical server where a VM is hosted on and a core layer device in a DC to which the physical server where the VM is hosted on belongs. "Nickname" is a forwarding identifier of the access layer device connecting the physical server where the VM is hosted on within the Trill network and a forwarding identifier of the core layer device in the DC to which the physical server where the VM is hosted on belongs within the Trill network. "Port" is a port of the access layer device through which the access layer device connects the physical server where the VM is hosted on. "VLAN ID" (an identifier of a VLAN) is an identifier of a VLAN where the VM locates.

"IP address of VM" is an IP address of each VM. "MAC address of VM" is an actual MAC address of the VM. "Virtual MAC address of VM" is a virtual MAC address of the VM. VLAN gateway addresses configured on Layer 3 (L3) interfaces of core1 and core2 respectively are 00-E0-FC-11-11-11, 00-E0-FC-22-22-22 and 00-E0-FC-33-33-33. Among them, 00-E0-FC-11-11-11 is a MAC address of a gateway of VLAN1, 00-E0-FC-22-22-22 is a MAC address of a gateway of VLAN2, and 00-E0-FC-33-33-33 is a MAC address of a gateway of VLAN3.

A logical "AND" operation is performed to the virtual MAC address of each VM and the access device mask ff-ff-ff-ff-00-00. An operation result is ED-01-00-01-00-00, which is a 48-bit aggregated MAC address. Therefore, virtual MAC addresses of VMs accessing the same access layer device are aggregated into an access device, mask-based, virtual MAC address. That is, virtual MAC addresses of VMs accessing leaf1 may be aggregated into ED-01-00-01-00-00. Virtual MAC addresses of VMs accessing leaf2 may be aggregated into ED-01-00-02-00-00, virtual MAC addresses of VMs accessing leaf3 may be aggregated into ED-01-00-03-00-00, and virtual MAC addresses of VMs accessing leaf4 may be aggregated into ED-01-00-04-00-00. Virtual MAC addresses of VMs within other DCs may be aggregated based on the access device mask in accordance with the same virtual MAC address encoding rule, the example of the present disclosure does not enumerate herein.

The logical "AND" operation is performed to the virtual MAC address of each VM and the DC mask ff-ff-00-00-00-00. An operation result is ED-01-00-00-00-00, which is a 48-bit aggregated MAC address. Therefore, virtual MAC addresses of VMs in the same DC can be aggregated into a DC, mask-based, virtual MAC address. That is, virtual MAC addresses of VMs in Dc1 may be aggregated into ED-01-00-00-00-00. In accordance with the same virtual MAC address encoding rule and based on the DC mask, virtual MAC addresses of VMs in Dc2 may be aggregated into ED-02-00-00-00-00, virtual MAC addresses of VMs in Dc3 may be aggregated into ED-03-00-00-00-00, and virtual MAC addresses of VMs in Dc4 may be aggregated into ED-04-00-00-00-00.

It should be noted that Uniqueness IDs and Data Center IDs of VMs in different DCs may be identical or different. According to an example, to ensure that Uniqueness IDs and Data Center IDs of VMs within a same DC are identical, an aggregation relationship of the VMs within the same DC is not destroyed, and an aggregation relationship of VMs accessing a same access layer device is not destroyed.

Before forwarding a packet, the network management apparatus configures a Layer 2 forwarding table on access layer RBridges and core layer RBridges in each DC according to the information about the VMs and the devices in the whole network maintained by the network management apparatus.

Table 2.1 illustrates a Layer 2 forwarding table configured on the access layer RBridge leaf1 within Dc1.

TABLE 2.1

| VLAN | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| 1 | 00-E0-FC-03-42-24 | ff-ff-ff-ff-ff-ff | ED-01-00-01-00-02 | Port1 |
| 1 | ED-01-00-01-00-02 | ff-ff-ff-ff-ff-ff | 00-E0-FC-03-42-24 | Port1 |
| 1 | 00-14-2A-EB-74-2F | ff-ff-ff-ff-ff-ff | ED-01-00-01-00-03 | Port1 |
| 1 | ED-01-00-01-00-03 | ff-ff-ff-ff-ff-ff | 00-14-2A-EB-74-2F | Port1 |
| 2 | 00-05-5B-A4-6B-28 | ff-ff-ff-ff-ff-ff | ED-01-00-01-00-04 | Port2 |
| 2 | ED-01-00-01-00-04 | ff-ff-ff-ff-ff-ff | 00-05-5B-A4-6B-28 | Port2 |
| 2 | 00-0F-E2-0F-9A-86 | ff-ff-ff-ff-ff-ff | ED-01-00-01-00-05 | Port2 |
| 2 | ED-01-00-01-00-05 | ff-ff-ff-ff-ff-ff | 00-0F-E2-0F-9A-86 | Port2 |
| 2 | 00-0C-76-0A-17-2D | ff-ff-ff-ff-ff-ff | ED-01-00-01-00-06 | Port2 |
| 2 | ED-01-00-01-00-06 | ff-ff-ff-ff-ff-ff | 00-0C-76-0A-17-2D | Port2 |
| 3 | 00-0D-88-F6-44-C1 | ff-ff-ff-ff-ff-ff | ED-01-00-01-00-07 | Port3 |
| 3 | ED-01-00-01-00-07 | ff-ff-ff-ff-ff-ff | 00-0D-88-F6-44-C1 | Port3 |
| 3 | 00-0D-88-F7-9F-7D | ff-ff-ff-ff-ff-ff | ED-01-00-01-00-08 | Port3 |
| 3 | ED-01-00-01-00-08 | ff-ff-ff-ff-ff-ff | 00-0D-88-F7-9F-7D | Port3 |
| 3 | 00-0D-88-F7-B0-90 | ff-ff-ff-ff-ff-ff | ED-01-00-01-00-09 | Port3 |
| 3 | ED-01-00-01-00-09 | ff-ff-ff-ff-ff-ff | 00-0D-88-F7-B0-90 | Port3 |
| VLAN unaware | ED-01-00-02-00-00 | ff-ff-ff-ff-00-00 | | DC1_leaf2 |
| VLAN unaware | ED-01-00-03-00-00 | ff-ff-ff-ff-00-00 | | DC1_leaf3 |
| VLAN unaware | ED-01-00-04-00-00 | ff-ff-ff-ff-00-00 | | DC1_leaf4 |
| VLAN unaware | ED-02-00-00-00-00 | ff-ff-00-00-00-00 | | DC1_core1 |
| VLAN unaware | ED-03-00-00-00-00 | ff-ff-00-00-00-00 | | DC1_core1 |
| VLAN unaware | ED-04-00-00-00-00 | ff-ff-00-00-00-00 | | DC1_core1 |
| 1 | 00-E0-FC-11-11-11 | ff-ff-ff-ff-ff-ff | | DC1_core1 |
| 2 | 00-E0-FC-22-22-22 | ff-ff-ff-ff-ff-ff | | DC1_core1 |
| 3 | 00-E0-FC-33-33-33 | ff-ff-ff-ff-ff-ff | | DC1_core2 |

In Table 2.1, Port 1, Port 2 and Port 3 respectively are ports through which leaf1 connects servers where VMs are hosted on. Dc1 leaf2, Dc1 leaf3 and Dc1 leaf4 respectively are nicknames of corresponding access layer RBridges in Dc1. Dc1_core1 is a nickname of core1 in Dc1, and Dc1_core2 is a nickname of core2 in Dc1. 00-E0-FC-11-11-11, 00-E0-FC-22-22-22 and 00-E0-FC-33-33-33 are gateway MAC addresses of VLAN1, VLAN2 and VLAN3, respectively.

In Table 2.1, core1 is configured for forwarding traffics among Dc1 and other DCs (e.g., Dc2, Dc3 and Dc4). Egress ports in three entries (i.e., three entries of which initial MAC addresses respectively are ED-02-00-00-00-00, ED-03-00-00-00-00 and ED-04-00-00-00-00) of a DC, mask-based, virtual MAC address are configured as the nickname of core1 (i.e., Dc1_core1).

When core1 is configured for forwarding traffics among Dc1 and Dc2 as well as Dc3, the egress ports in the two entries of which the initial MAC addresses respectively are ED-02-00-00-00-00 and ED-03-00-00-00-00 are configured as the nickname of core1 (i.e., Dc1_core1). When core2 is configured for forwarding traffics between Dc1 and Dc4, the egress port in the entry of which the initial MAC address is ED-04-00-00-00-00 is configured as the nickname of core2 (i.e., Dc1_core2).

When core1 and core2 form a virtual apparatus in a manner of stacking, wherein the virtual apparatus is configured for transmitting traffics among Dc1 and the other three DCs, the egress ports in the three entries of which the initial MAC address respectively are ED-02-00-00-00-00, ED-03-00-00-00-00 and ED-04-00-00-00-00 are configured as a nickname of the virtual apparatus.

Furthermore, a corresponding multicast forwarding entry is configured on an access layer device for a multicast service. For example, a root of a multicast tree of a multicast group within Dc1 is core1 (the nickname of core1 is Dc1_core1). For multicast group 1 (a multicast address is 01-00-5E-XX-XX-XX) in VLAN1, a physical server where a VM that is configured as a multicast source of multicast group 1 is hosted on is connected to leaf1, and a physical server where another VM configured as a multicast receiver of multicast group 1 is hosted on is connected to Port1 of leaf3, and a physical server where a third VM configured as the multicast receiver of multicast group 1 is hosted on is connected to Port1 of leaf4. Corresponding multicast forwarding entries in Layer 2 forwarding tables configured on leaf1, leaf3 and leaf4 respectively include:

Table 2.2 The multicast forwarding entry in the Layer 2 forwarding table on leaf1

| VLAN | Initial MAC address | Mask | Mapped MAC address | Egress Port |
|---|---|---|---|---|
| 1 | 01-00-5E-XX-XX-XX | ff-ff-ff-ff-ff-ff | | DC1_core1 |

Table 2.3 The multicast forwarding entry in the Layer 2 forwarding table on leaf3

| VLAN | Initial MAC address | Mask | Mapped MAC address | Egress Port |
|---|---|---|---|---|
| 1 | 01-00-5E-XX-XX-XX | ff-ff-ff-ff-ff-ff | | Port1 |

Table 2.4 The multicast forwarding entry in the Layer 2 forwarding table on leaf4

| VLAN | Initial MAC address | Mask | Mapped MAC address | Egress Port |
|---|---|---|---|---|
| 1 | 01-00-5E-XX-XX-XX | ff-ff-ff-ff-ff-ff | | Port1 |

A VM configured as the receiver of the multicast group 1 is connected to leaf1 via Port2, and then Port 2 is added to the egress port in the multicast forwarding entry shown in Table 2.2.

A way for configuring multicast forwarding entries of Layer 2 forwarding tables of access layer devices in Dc2, Dc3 and Dc4 is the same as the way for configuring the multicast forwarding entries of the Layer 2 forwarding tables of access layer devices in Dc1, the example of the present disclosure does not describe in detail herein.

A Layer 2 forwarding table of core1 may for example include entries shown in Table 2.5

TABLE 2.5

| VLAN | Initial MAC address | Mask | Mapped MAC address | Egress Port |
|---|---|---|---|---|
| VLAN unaware | ED-01-00-01-00-00 | ff-ff-ff-ff-00-00 | | DC1_leaf1 |
| VLAN unaware | ED-01-00-02-00-00 | ff-ff-ff-ff-00-00 | | DC1_leaf2 |
| VLAN unaware | ED-01-00-03-00-00 | ff-ff-ff-ff-00-00 | | DC1_leaf3 |

TABLE 2.5-continued

| VLAN | Initial MAC address | Mask | Mapped MAC address | Egress Port |
|---|---|---|---|---|
| VLAN unaware | ED-01-00-04-00-00 | ff-ff-ff-ff-00-00 | | DC1_leaf4 |
| VLAN unaware | ED-02-00-00-00-00 | ff-ff-00-00-00-00 | | IP2 |
| VLAN unaware | ED-03-00-00-00-00 | ff-ff-00-00-00-00 | | IP3 |
| VLAN unaware | ED-04-00-00-00-00 | ff-ff-00-00-00-00 | | IP4 |
| 1 | 00-E0-FC-11-11-11 | ff-ff-ff-ff-ff-ff | | L3 |
| 2 | 00-E0-FC-22-22-22 | ff-ff-ff-ff-ff-ff | | L3 |
| m | Next-hop MAC | ff-ff-ff-ff-ff-ff | | Port m |

A Layer 2 forwarding table of core2 may for example include entries shown in Table 2.6

TABLE 2.6

| VLAN | Initial MAC address | Mask | Mapped MAC address | Egress Port |
|---|---|---|---|---|
| VLAN unaware | ED-01-00-01-00-00 | ff-ff-ff-ff-00-00 | | DC1_leaf1 |
| VLAN unaware | ED-01-00-02-00-00 | ff-ff-ff-ff-00-00 | | DC1_leaf2 |
| VLAN unaware | ED-01-00-03-00-00 | ff-ff-ff-ff-00-00 | | DC1_leaf3 |
| VLAN unaware | ED-01-00-04-00-00 | ff-ff-ff-ff-00-00 | | DC1_leaf4 |
| 3 | 00-E0-FC-33-33-33 | ff-ff-ff-ff-ff-ff | | L3 |
| n | Next-hop MAC' | ff-ff-ff-ff-ff-ff | | Port n |

Among them, Dc1_leaf1, Dc1_leaf2, Dc1_leaf3 and Dc1_leaf4 are the nicknames of leaf1, leaf2, leaf3 and leaf4 in Dc1, respectively. IP2, IP3 and IP4 respectively are IP addresses of Dc2, Dc3 and Dc4 which are defined according to the protocol. These IP addresses may be used as a destination IP address of a MAC over IP tunnel when core1 of Dc1 sends data to these three DCs. Accordingly, IP1 is an IP address of Dc1, and may be used as the destination IP address of the MAC over IP tunnel when the other three DCs send data to Dc1. 00-E0-FC-11-11-11, 00-E0-FC-22-22-22, and 00-E0-FC-33-33-33 are gateway MAC addresses of VLAN1, VLAN2 and VLAN3, respectively. L3 is a Layer 3 forwarding identifier, and is used to indicate that Layer 3 forwarding is performed to an Ethernet packet with a matched destination MAC address.

A way for configuring Layer 2 forwarding tables of core layer RBridges on Dc2, Dc3 and Dc4 is the same as the way for configuring the Layer 2 forwarding tables shown in Table 2.5 or Table 2.6, which is not described in detail herein.

In order to support forwarding a packet to a VLAN of an external network (e.g., VLAN m), a corresponding entry (shown in the last row of Table 2.5) is included in the Layer 2 forwarding table of core1 shown in Table 2.5, wherein the entry includes an identifier m which is the identifier of VLAN m, a next-hop MAC which is a MAC address of a next-hop device from core1 to VLAN m, and Port m which is the egress port. Core1 learns the MAC address of the next-hop device according to an Address Resolution Protocol (ARP) packet. Next-hop devices of core1 and core2 are different, so that a next-hop device entry (shown in the last row of Table 2.6) learnt by core2 includes an identifier n which is the identifier of VLAN n, a next-hop MAC' which is a MAC address of a next-hop device from core2 to VLAN n, and Port n which is the egress port.

Figure 2:
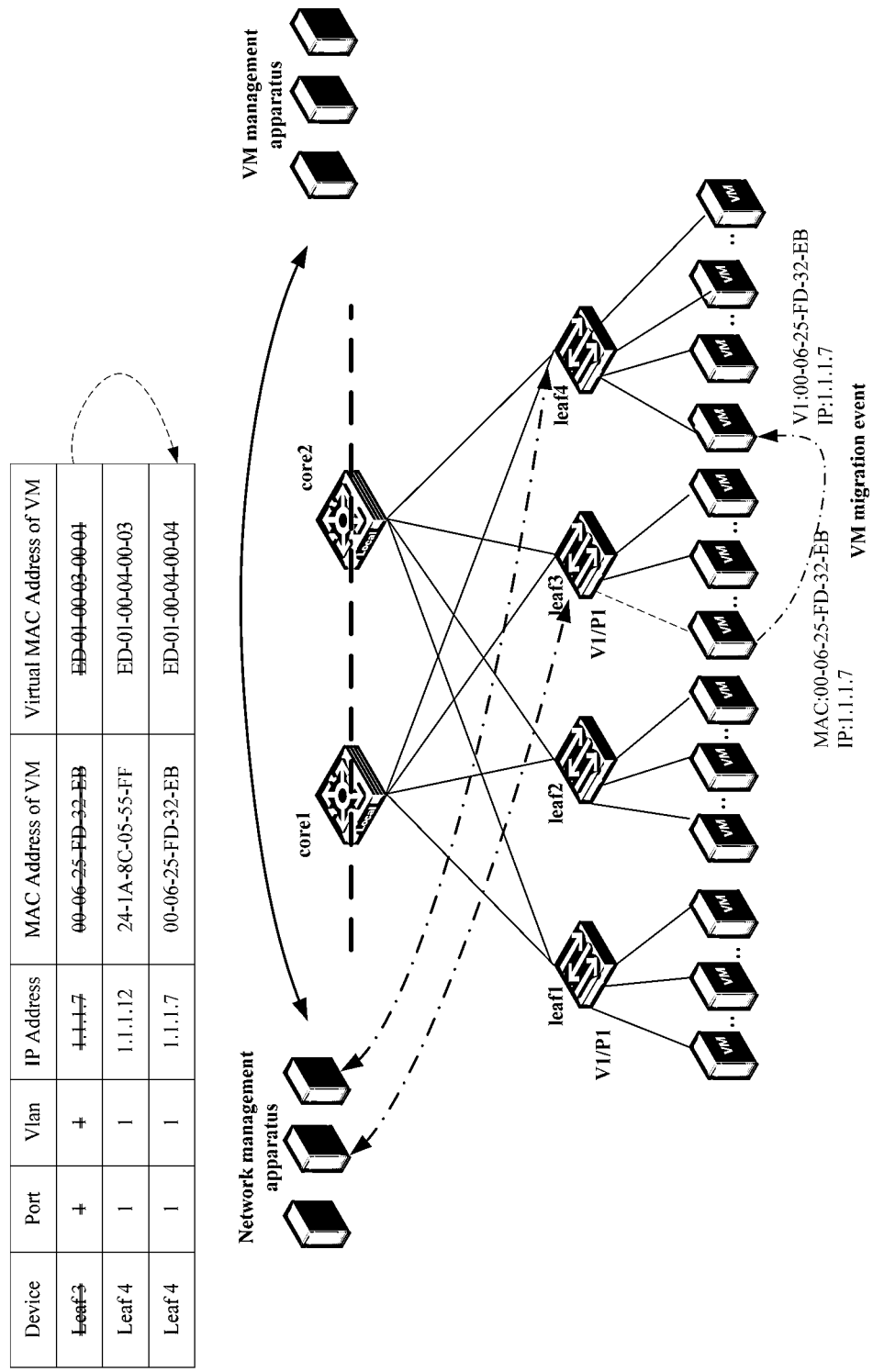
FIG. 2 is a schematic diagram illustrating VM migration according to an example of the present disclosure.

Based on the networking structure shown in FIG. 1, FIG. 2 is a schematic diagram illustrating VM migration according to an example of the present disclosure.

In this case, a VM is migrated from a physical server connected to leaf3 to a physical server connected to leaf4. An actual MAC address and an IP address of the VM are not changed.

The physical server where the VM is hosted on before the migration is regarded as a source physical server, and leaf3 connecting the source physical server may be regarded as a source access layer device of a migrated host. A physical server where the VM is hosted on after the migration is regarded as a target physical server, and leaf4 connecting the target physical server may be regarded as a target access layer device of the migrated host.

A VM migration event is notified by leaf3 to the network management apparatus (i.e., the network management plane). According to the Virtual Station Interface Discovery and Configuration Protocol (VSI Discovery and Configuration Protocol) defined in 802.1Qbg, a physical switch may detect a VM migration process, and notify the change information to the network management apparatus.

The network management apparatus deletes the migrated VM from the information of VMs accessing leaf3 according to the information notified by leaf3. The network management apparatus configures a new virtual MAC address for the VM which is migrated to leaf4 in accordance with the virtual MAC address encoding rule, and add information about the migrated VM to the information of VMs accessing leaf4, so as to ensure that an outward aggregation relationship is not destroyed, i.e., virtual MAC addresses of VMs accessing leaf4 can still be aggregated into a virtual MAC address.

The network management apparatus adds to the Layer 2 forwarding table of leaf4 Layer 2 forwarding entries associated with the actual MAC address and the virtual MAC address of the migrated VM, and deletes from the Layer 2 forwarding table of leaf3 the Layer 2 forwarding entries associated with the actual MAC address and the virtual MAC address of the migrated VM.

The purpose of this operation is to reduce the occupation of invalid entries. This operation may also be implemented by other ways, e.g., the Layer 2 forwarding entry of the VM migrated from leaf3 is marked as an invalid entry. The example of the present disclosure does not limit herein.

The migrated VM broadcasts a gratuitous ARP packet. After receiving the gratuitous ARP packet, leaf4 replaces a "source MAC address" and a "sender MAC address" of the gratuitous ARP packet with the virtual MAC address of the migrated VM based on the Layer 2 forwarding table, and broadcasts the received gratuitous ARP packet. Leaf4 broadcasts the gratuitous ARP packet at another port which is in the same VLAN as a port receiving the gratuitous ARP packet, performs a Trill encapsulation to the gratuitous ARP packet and broadcasts the Trill-encapsulated gratuitous ARP packet in the Trill network. A gateway and another VM which is in the same VLAN as the migrated VM learn an ARP entry according to the gratuitous ARP packet, and the original virtual MAC address corresponding to the IP address of the migrated VM is refreshed to the newly-assigned virtual MAC address.

According to the ARP protocol, an actual MAC address of a device is wrote to a sender MAC address when the device sends a gratuitous ARP packet, and another device learns an ARP entry according to a "sender IP address" and the "sender MAC address" when the other device receives the gratuitous ARP packet.

If leaf4 does not modify the sender MAC address of the gratuitous ARP packet, the MAC address in the ARP entry learnt by the gateway and the other VM belonging to the same VLAN as the migrated VM is the actual MAC address of the migrated VM. The gateway and the other VM belonging to the same VLAN as the migrated VM send to the migrated VM an Ethernet packet, and the actual MAC address of the migrated VM is used as a destination MAC address. When the destination MAC address of the Ethernet packet received by leaf4 is the actual MAC address of the migrated VM, the destination MAC address of the packet is mapped to the virtual MAC address of the migrated VM according to the Layer 2 forwarding table and the packet is sent to the migrated VM. When the destination MAC address of the Ethernet packet received by the migrated VM is the virtual MAC address of the migrated VM itself, the migrated VM discards the packet, which causes the loss of the packet.

For example, as shown in FIG. 2, a VM of which an IP address is 1.1.1.7 is migrated from a physical server connected to a source access layer device to a physical server connected to a target access layer device. A virtual MAC address assigned by the network management apparatus for the migrated VM is ED-01-01-04-00-04. The network management apparatus configures leaf4 forwarding entries associated with the migrated VM. When the migrated VM sends a gratuitous ARP packet, a source MAC address of an Ethernet header of the gratuitous ARP packet and a sender MAC address of the gratuitous ARP packet are replaced by leaf4 according to the configured forwarding entry. In the ARP entry learnt by the gateway and the other VM belonging to the same VLAN as the migrated VM, a MAC address corresponding to the IP address 1.1.1.7 is ED-01-01-04-00-04.

In another scenario that a VM hosted on a physical server is deleted, an access layer device notifies the network management apparatus of this VM event. The network management apparatus deletes information about the deleted VM and a pair of Layer 2 forwarding entries associated with the deleted VM (not shown in FIG. 2) according to the notification of the access layer device.

Still in another scenario that a VM is added to the physical server, the access layer device notifies the network management apparatus of this VM event. The network management apparatus configures a virtual MAC address for the newly-added VM in accordance with the virtual MAC address encoding rule, and adds information about the newly-added VM into the VM information of the access layer device to ensure that an outward aggregation relationship is not destroyed.

The network management apparatus configures, in the Layer 2 forwarding table of the access layer device, a pair of Layer 2 forwarding entries associated with the newly-added VM. The newly-added VM broadcasts a gratuitous ARP packet. The access layer device replaces a source MAC address and a sender MAC address of the gratuitous ARP packet with the virtual MAC address of the newly-added VM according to the configured Layer 2 forwarding entries, and broadcasts the gratuitous ARP packet in a VLAN to which the newly-added VM belongs and in the Trill network, so that an IP address and the virtual MAC address of the newly-added VM (not shown in FIG. 2) is recorded in an ARP entry learnt by the gateway and the other VM belonging to the same VLAN as the newly-added VM.

Examples of the present disclosure may handle a packet forwarding mechanism of the VLL2 network, and may include one or more of the following aspects.

The first aspect is that a RBridge searches out a matched entry in the Layer 2 forwarding table according to a source MAC address of an Ethernet packet (the source MAC address is an inner source MAC address compared to a Trill-encapsulated packet), wherein a mapped MAC address is included in the matched entry, the source MAC address of the Ethernet packet is replaced with the mapped MAC address. Similarly, the RBridge searches out a matched entry in the Layer 2 forwarding table according to a destination MAC address of the Ethernet packet (the destination MAC address is an inner destination MAC address compared to the Trill-encapsulated packet), wherein a mapped MAC address is included in the matched entry, the destination MAC address of the Ethernet packet is replaced with the mapped MAC address.

The second aspect is that the RBridge supports a mask-based MAC address searching mode. A logical "AND" operation is performed by the RBridge to the source MAC address/the destination MAC address of an Ethernet header (an inner Ethernet header of the Trill packet) and a "mask" of each entry. An operation result is compared with an "Initial MAC address" in the corresponding entry. It is determined that the matched entry is found if the operation result is the same as the "Initial MAC address" in the corresponding entry.

The third aspect is that the RBridge supports VLAN aware forwarding and VLAN unaware forwarding. The VLAN aware mode uses a VLAN ID and the MAC address of the Ethernet header to search for an entry recording the VLAN ID. The VLAN unaware mode uses the source MAC address and the destination MAC address of the inner Ethernet header to search for an entry not recording the VLAN ID.

Through a VLAN unaware entry, virtual MAC addresses of VMs connected to a same access layer device and belonging to different VLANs are aggregated into one entry, and virtual MAC addresses of VMs in a same DC but belonging to different VLANs are aggregated into one entry. Therefore, the number of the Layer 2 forwarding entries of the access layer device and the core layer device is significantly reduced.

The fourth aspect is that the Layer 2 forwarding table of the access layer device is configured by the network management apparatus, and the Layer 2 forwarding table of the core layer device includes an entry configured by the network management apparatus and an entry dynamically generated according to an existing MAC address learning mechanism. For example, an outward interface of the core layer device enables the MAC address learning. In this case, a 48-bit host mask is configured in the Layer 2 forwarding table for the MAC address learnt by the core layer device. The MAC address learning of the core layer device and the access layer device may flexibly enable and disable a port or a plurality of global ports.

The fifth aspect is that when a VM sends a packet towards multiple destinations (e.g., a broadcast packet, a group aware packet, a group unaware packet or a unicast unaware packet), the destination MAC addresses in the packet are not aggregated.

Figure 3:
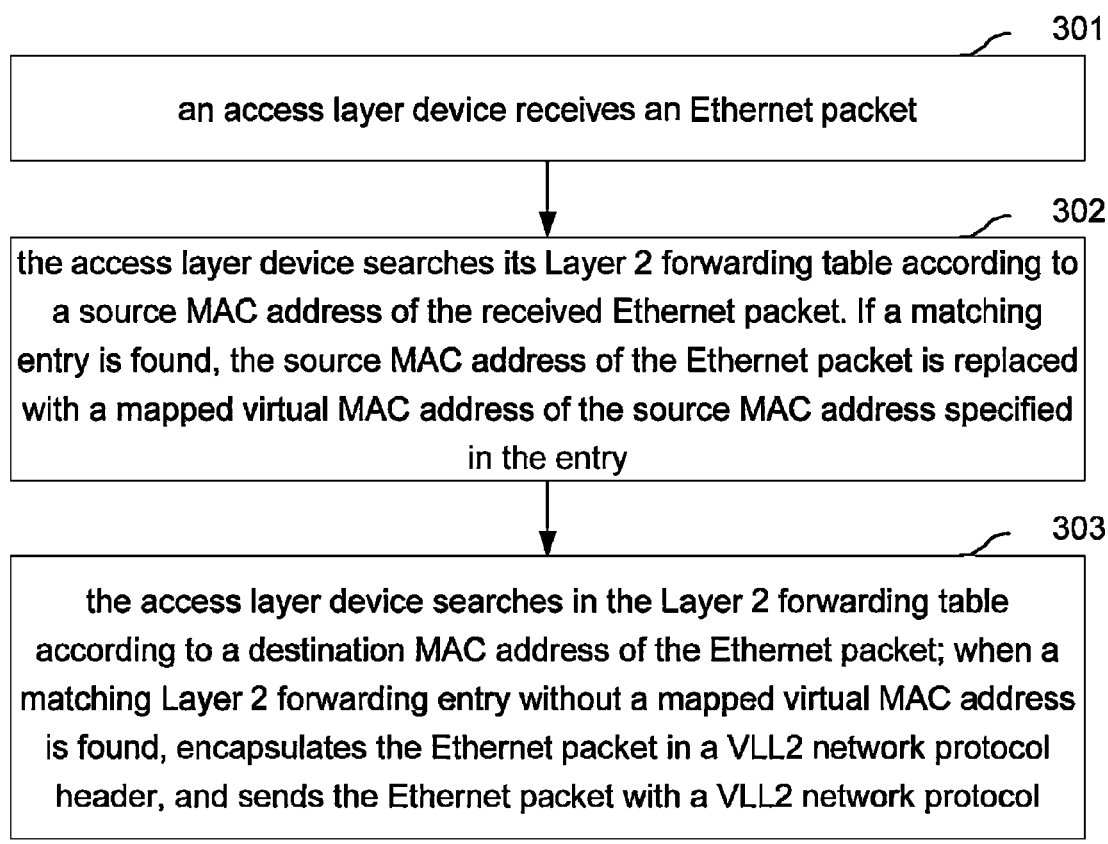
FIG. 3 is a flowchart illustrating a method for forwarding a packet according to an example of the present disclosure.

FIG. 3 is a flowchart illustrating a method for forwarding a packet in accordance with an example of the present disclosure. As shown in FIG. 3, the method may include operations as follows.

In block 301, an access layer device receives an Ethernet packet. The access layer device stores a Layer 2 forwarding table including entries for Layer 2 routing. An example of the forwarding table is described below with respect to the description of FIG. 4A and other examples described below.

In block 302, the access layer device searches its Layer 2 forwarding table according to a source MAC address of the received Ethernet packet. For example, the Layer 2 forwarding table is searched to find a matching entry. If a matching entry is found, the source MAC address of the Ethernet packet is replaced with a mapped virtual MAC address of the source MAC address specified in the entry. According to an example, to find a matching entry for the source MAC address in the Layer 2 forwarding table, an operation is performed on the source MAC address and a bit mask in an entry. If the result of the operation is the same as an initial MAC address of the entry, then the entry is considered a match. This operation may be performed on each entry until a match is found if a match exists in the table. The matching is further described with respect to FIG. 4A and other examples described below.

In block 303, the access layer device searches in the Layer 2 forwarding table according to a destination MAC address of the Ethernet packet. For example, an operation is performed on the destination MAC address and a bitmask in an entry. If the result of the operation is the same as an initial MAC address of the entry, then the entry is considered a match. This operation may be performed on each entry until a match is found if a match exists in the table. If a matching entry for the destination MAC address is found and the matching entry for the destination MAC address does not include a mapped virtual MAC address for the destination MAC address, the access layer device determines an egress port specified in the matching entry and encapsulates the Ethernet packet in a VLL2 protocol header, such as a Trill header, and sends the encapsulated packet towards the destination via the egress port.

In order to make the packet forwarding mechanism in the example of the present disclosure more clearly, packet forwarding processes under several typical scenarios are described hereinafter by taking the networking architecture shown in FIG. 1 and the foregoing virtual MAC address encoding rule as an example.

Figure 4A:
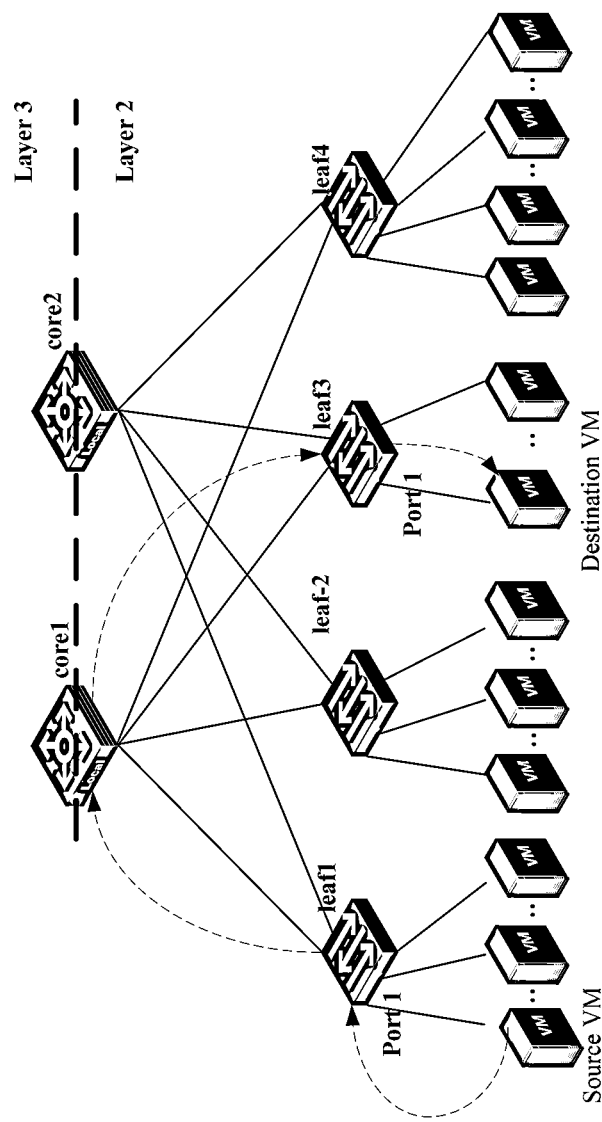
FIG. 4A is a schematic diagram illustrating Layer 2 forwarding within a data center according to an example of the present disclosure.

FIG. 4A is a schematic diagram illustrating Layer 2 forwarding within a DC according to an example of the present disclosure. In this case, a source VM is hosted on a physical server connected to port1 of leaf1, and a destination VM is hosted on a physical server connected to port1 of leaf3. IP addresses of the source VM and the destination VM respectively are 1.1.1.1 and 1.1.1.8.

In FIG. 4A, a Layer 2 forwarding table of leaf1 at least includes entries shown in Table 3.1.

TABLE 3.1

| VLAN ID | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| VLAN unaware | ED-01-00-03-00-00 | ff-ff-ff-ff-00-00 | | DC1_leaf3 |
| 1 | 00-E0-FC-11-11-11 | ff-ff-ff-ff-ff-ff | | DC1_core1 |
| 2 | 00-E0-FC-22-22-22 | ff-ff-ff-ff-ff-ff | | DC1_core1 |
| 3 | 00-E0-FC-33-33-33 | ff-ff-ff-ff-ff-ff | | DC1_core2 |

A Layer 2 forwarding table of leaf3 at least includes entries shown in Table 3.2.

TABLE 3.2

| VLAN ID | Initial MAC address | Mask | Mapped MAC address | Egress Port |
|---|---|---|---|---|
| 1 | 00-1D-A1-75-28-70 | ff-ff-ff-ff-ff-ff | ED-01-00-03-00-02 | Port1 |
| 1 | ED-01-00-03-00-02 | ff-ff-ff-ff-ff-ff | 00-1D-A1-75-28-70 | Port1 |
| VLAN unaware | ED-01-00-01-00-00 | ff-ff-ff-ff-00-00 | | DC1_leaf1 |
| 1 | 00-E0-FC-11-11-11 | ff-ff-ff-ff-ff-ff | | DC1_core1 |
| 2 | 00-E0-FC-22-22-22 | ff-ff-ff-ff-ff-ff | | DC1_core1 |
| 3 | 00-E0-FC-33-33-33 | ff-ff-ff-ff-ff-ff | | DC1_core2 |

A Layer 2 forwarding table of core1 at least includes entries shown in Table 3.3.

TABLE 3.3

| VLAN ID | Initial MAC address | Mask | Mapped MAC address | Egress Port |
|---|---|---|---|---|
| VLAN unaware | 00-5F-AA-95-82-07 | ff-ff-ff-ff-ff-ff | | DC1_leaf2 |
| VLAN unaware | ED-01-00-02-00-00 | ff-ff-ff-ff-00-00 | | DC1_leaf2 |
| VLAN unaware | ED-01-00-03-00-00 | ff-ff-ff-ff-00-00 | | DC1_leaf3 |
| VLAN unaware | ED-01-00-04-00-00 | ff-ff-ff-ff-00-00 | | DC1_leaf4 |
| 1 | 00-E0-FC-11-11-11 | ff-ff-ff-ff-ff-ff | | DC1_core1 |
| 2 | 00-E0-FC-22-22-22 | ff-ff-ff-ff-ff-ff | | DC1_core1 |

The source VM sends an Ethernet packet to leaf1, wherein a source MAC address of the Ethernet packet is 00-11-11-11-11-11, and a destination MAC address of the Ethernet packet is ED-01-00-03-00-02.

In this case, the source VM determines that the destination IP address 1.1.1.8 of an IP packet belongs to the same IP network segment as the IP address 1.1.1.1 of its own source VM. The source VM searches an ARP table based on the destination IP address 1.1.1.8, and finds that a MAC address recorded in an ARP entry searched out and corresponding to the destination IP address 1.1.1.8 is a virtual MAC address ED-01-00-03-00-02. The source VM encapsulates the IP packet into the Ethernet packet of which the source MAC address is 00-11-11-11-11-11 and the destination MAC address is ED-01-00-03-00-02.

A logic "AND" operation is performed by leaf1 to the source MAC address 00-11-11-11-11-11 of the received Ethernet packet and a 48-bit mask ff-ff-ff-ff-ff-if in a Layer 2 forwarding entry (shown in the second row of Table 3.1), and an operation result is 00-11-11-11-11-11 which is the same as an initial MAC address 00-11-11-11-11-11 of the Layer 2 forwarding entry, and it is determined that the entry is searched out (i.e., a matching entry). Leaf1 replaces the source MAC address of the Ethernet packet with a mapped MAC address ED-01-00-01-00-01 in the matching entry.

The logic "AND" operation is performed by leaf1 to the destination MAC address ED-01-00-03-00-02 of the received Ethernet packet and a 32-bit access device mask ff-ff-ff-ff-00-00 in an entry (shown in the fourth row of Table 3.1), and an operation result is ED-01-00-03-00-00 which is the same as an initial MAC address ED-01-00-03-00-00 of the entry. Leaf1 determines that the entry is searched out (i.e., a matching entry for the destination MAC address). Leaf1 forwards the Ethernet packet to leaf3 via Dc1_leaf3 which is an egress port in the entry searched out. Leaf1 encapsulates a Trill header for the received Ethernet header based on Dc1_leaf3. In the Trill header, an Ingress nickname is a nickname of leaf1, an Egress nickname is Dc1_leaf3 (i.e., the nickname of leaf3). Then, leaf1 encapsulates a next-hop header for the Ethernet packet. In the next-hop header, a source MAC address is the MAC address of leaf1, a destination MAC address is the MAC address of core1, and a VLAN ID is an ID of a designated VLAN. The next-hop header is a next-hop header changed hop by hop. There is an Ethernet link between RBridges in this example, therefore the next-hop header encapsulated by leaf1 outside the Trill header is regarded as an outer Ethernet header. Leaf1 may determine, according to a Trill routing table, that the next hop to leaf3 is core1, and then search out the MAC address of core1 according to a Trill adjacent table. The source MAC address and the destination MAC address of the next-hop header are used to identify a transmitting RBridge and a next-hop RBridge. The Trill-encapsulated packet is forwarded by leaf1 to core1.

Core1 receives the Trill-encapsulated packet, decapsulates the outer Ethernet header, and re-encapsulates a next-hop header based on the Egress Nickname of the Trill header. In the re-encapsulated next-hop header, the source MAC address is the MAC address of core1, the destination MAC address is the MAC address of leaf3, and the VLAN ID is the designated VLAN ID. The re-encapsulated Trill packet is forwarded by core1 to the next hop leaf3.

After receiving the Trill packet, leaf3 detects that the destination MAC address of the next-hop header is the MAC address of leaf3 itself, then removes the next-hop header. Leaf3 determines that the Egress nickname of the Trill header is Dc1_leaf3 of leaf3, and then removes the Trill header. The inner Ethernet packet is obtained by leaf3.

An entry (shown in the fourth row of Table 3.2) is searched out by leaf3 in the Layer 2 forwarding table shown in Table 3.2 according to the source MAC address ED-01-00-01-00-01 of the inner Ethernet packet. As mentioned above, leaf1 replaced the initial source MAC address with ED-01-00-01-00-01 in the inner Ethernet packet. ED-01-00-01-00-01 was the mapped MAC address of the matching entry. In leaf 3, if the mapped MAC address is not included in the entry searched out, the source MAC address (i.e., ED-01-00-01-00-01) of the Ethernet packet is not replaced. An entry (shown in the third row of Table 3.2) including a mapped MAC address is searched out by leaf3 according to the destination MAC address ED-01-00-03-00-02 of the Ethernet packet. Leaf3 replaces the destination MAC address of the Ethernet packet with 00-1D-A1-75-28-70, and forwards the Ethernet packet received via port1 that is the egress port of the entry searched out.

In the above operations, the logical "AND" operation is performed by leaf3 to the source MAC address ED-01-00-01-00-01 and a 32-bit mask if-if-if-if-00-00 in the entry shown in the fourth row of Table 3.2, and an operation result is ED-01-00-01-00-00 which is the same as the initial MAC address ED-01-00-01-00-00 in the entry, then it is determined that the entry is searched out. The logical "AND" operation is performed by leaf3 to the destination MAC address ED-01-00-03-00-02 and a 48-bit mask if-if-if-if-if-if in the entry shown in the third row of Table 3.2, and an operation result is ED-01-00-03-00-02 which is the same as the initial MAC address ED-01-00-03-00-02 in the entry, then it is determined that the entry is searched out.

In FIG. 4A, if the source VM does not find the ARP entry corresponding to the destination IP address 1.1.1.8 in the ARP table, the source VM sends an ARP request packet to request a MAC address corresponding to the destination IP address 1.1.1.8. In this case, a Sender IP address of the ARP request packet is 1.1.1.1, a Sender MAC address is 00-11-11-11-11-11, a Target IP address is 1.1.1.8, and a Target MAC address is 00-00-00-00-00-00. A source MAC address and a destination MAC address of an Ethernet header of the ARP request packet respectively are 00-11-11-11-11-11 and a broadcast address ff-ff-ff-ff-ff-ff.

Figure 4B:
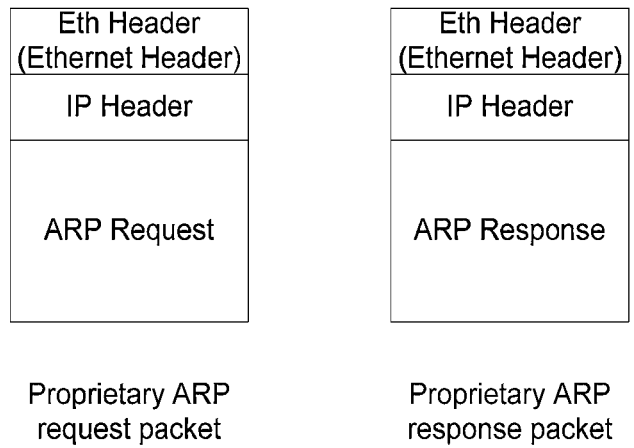
FIG. 4B is a schematic diagram illustrating a proprietary ARP request packet according to an example of the present disclosure.

After receiving the ARP request packet, leaf1 does not broadcast the ARP request packet in the Trill network, but converts the received ARP request packet into a proprietary ARP request packet (as shown in FIG. 4B). The proprietary ARP request packet is sent to the network management apparatus by leaf1 in a manner of unicast.

Leaf1 removes the Ethernet header of the received ARP request packet and encapsulates an IP header for the packet.

In the IP header, a source IP address is a local IP address 1.1.1.30 of leaf1, a destination IP address is the IP address 122.1.2.1 of the network management apparatus. Then, leaf1 encapsulates a next-hop header changed hop-by-hop outside the IP header. In the example of the present disclosure, the next-hop header changed hop-by-hop is an Ethernet header. In the next-hop header changed hop-by-hop, a source MAC address is a local MAC address 00-5F-AA-95-82-07 corresponding to leaf1 (corresponding to the source IP address 1.1.1.30 of the IP header), a destination MAC address is the MAC address of the gateway of VLAN1, i.e., 00-E0-FC-11-11-11.

Leaf1 does not search out a Layer 2 forwarding entry according to the source MAC address of the proprietary ARP request packet. Leaf1 searches out a Layer 2 forwarding entry (shown in the fifth row of Table 3.1) not including a mapped MAC address according to the destination MAC address 00-E0-FC-11-11-11, encapsulates the proprietary ARP request packet into a Trill-encapsulated proprietary ARP request packet based on Dc1_core1 which is an egress port of the entry searched out and sends to core1 the packet. In this case, leaf1 encapsulates a Trill header and an Ethernet header (an outer Ethernet header) outside the proprietary ARP request packet. The Ethernet header of the proprietary ARP request packet is positioned between the Trill header and the IP header, and can still be regarded as the inner Ethernet header. The Ethernet header outside the Trill header can still be regarded as the outer Ethernet header.

Core1 receives the Trill-encapsulated packet, removes the Trill encapsulation (the outer Ethernet header and the Trill header), removes the inner Ethernet header, and re-encapsulates an Ethernet header (a next-hop header changed hop-by-hop) based on the destination IP address of the IP header of the proprietary ARP request packet. In the next-hop header changed hop-by-hop, a destination MAC address is a MAC address of a next hop to the destination IP address, a VLAN ID is an identifier of a VLAN to which the next-hop device belongs, and a source MAC address is a MAC address of a L3 interface of core1, wherein the L3 interface is in the same VLAN as the next-hop device. After receiving the proprietary ARP request re-encapsulated by core1, the next-hop device performs Layer 3 forwarding according to the destination IP address of the IP header of the proprietary ARP request packet to forward the proprietary ARP request packet to the network management apparatus. The way that the next-hop device forwards the packet is similar to the forwarding process of core1, the example of the present disclosure does not repeat herein.

After receiving the proprietary ARP request packet, the network management apparatus searches the information table about the devices and VMs in the whole network as shown in Table 1 for the virtual MAC address ED-01-00-03-00-02 corresponding to the IP address 1.1.1.8. The IP address 1.1.1.1 and the MAC address 00-11-11-11-11-11 corresponding to this IP address respectively are configured as a Target IP address and a Target MAC address of an ARP response packet (the IP address 1.1.1.1 and the MAC address 00-11-11-11-11-11 respectively are the Sender IP address and the Sender MAC address of the ARP request packet received by the network management apparatus). The IP address 1.1.1.8 and the virtual MAC address ED-01-00-03-00-02 of the destination VM respectively are configured as a Sender IP address and a Sender MAC address of the ARP response packet. The ARP response packet is encapsulated into a unicast proprietary ARP response packet (as shown in FIG. 4B). That is, the network management apparatus encapsulates an IP header and an Ethernet header (a next-hop header changed hop-by-hop) for the ARP response packet. In this case, a source IP address of the IP header of the proprietary ARP response packet is the IP address 122.1.2.1 of the network management apparatus, and a destination IP address is the IP address 1.1.1.30 of leaf1. A source MAC address of the Ethernet header of the proprietary ARP response packet is the MAC address of the network management apparatus, and a destination MAC address is a MAC address of a next-hop device towards the destination IP address. By this way, the source MAC address and the destination MAC address of the Ethernet header of the proprietary ARP response packet are changed hop-by-hop, but the destination IP address of the proprietary ARP response packet is not changed. Therefore, the proprietary ARP response packet is sent to core1 hop-by-hop, wherein core1 is used as the gateway of VLAN1.

Core1 receives the proprietary ARP response packet, performs Layer 3 forwarding according to the destination IP address of the IP header of the proprietary ARP response packet, and replaces the source MAC address and the destination MAC address of the Ethernet header of the proprietary ARP response packet with the MAC address 00-E0-FC-11-11-11 of the gateway of VLAN1 and the MAC address 00-5F-AA-95-82-07 of leaf1, respectively. Core1 searches out an entry (shown in the second row of Table 3.3) according to the destination MAC address 00-5F-AA-95-82-07 of the Ethernet header of the proprietary ARP response packet, performs Trill encapsulation to the proprietary ARP response packet, and sends to leaf1 the Trill-encapsulated proprietary ARP response packet within the Trill domain.

Leaf1 receives the Trill-encapsulated proprietary ARP response packet, removes the outer Ethernet header and the Trill header, removes the Ethernet header and the IP header of the proprietary ARP response packet, and configures an Ethernet header for the ARP response packet. Specifically, an entry (shown in the fourth row of Table 3.1) searched out by leaf1 according to the Sender MAC address ED-01-00-03-00-02 does not include a mapped virtual MAC address, the Sender MAC address is configured as the source MAC address of the ARP response packet. An entry (shown in the second row of Table 3.1) searched out by leaf1 according to the Target MAC address 00-11-11-11-11-11 includes a mapped virtual MAC address ED-01-00-01-00-01, and the mapped virtual MAC address ED-01-00-01-00-01 is used as the destination MAC address of the ARP response packet. In the configured Ethernet header, the source MAC address is ED-01-00-03-00-02, and the destination MAC address is ED-01-00-01-00-01.

An entry (shown in the fourth row of Table 3.1) searched out by leaf1 based on the source MAC address ED-01-00-03-00-02 of the ARP response packet does not include a mapped MAC address. An entry (shown in the third row of Table 3.1) searched out by leaf1 based on the destination MAC address ED-01-00-01-00-01 includes a mapped MAC address 00-11-11-11-11-11, the destination MAC address ED-01-00-01-00-01 of the Ethernet header of the ARP response packet is replaced with the mapped MAC address 00-11-11-11-11-11, and the ARP response packet is sent to the source VM via Port1 which is the egress port of the entry. Leaf1 forwards the ARP response packet to the source VM. The source VM learns an ARP entry according to the received ARP response packet, wherein the ARP entry records a mapping relationship between the IP address 1.1.1.8 and the virtual MAC address ED-01-00-03-00-02.

In the example of the present disclosure, the network management apparatus may employ another way to configure a pair of sender addresses and a pair of target addresses of the proprietary ARP response packet. The IP address 1.1.1.1 and the MAC address ED-01-00-01-00-01 are configured by the network management apparatus as the Target IP address and the Target MAC address of the ARP response packet, respectively (the Target IP address 1.1.1.1 is the Sender IP address of the received ARP request packet, and the Target MAC address ED-01-00-01-00-01 is a virtual MAC address mapped to the Sender MAC address of the received ARP request packet). The IP address 1.1.1.8 and the virtual MAC address ED-01-00-03-00-02 of the destination VM are configured by the network management apparatus as the Sender IP address and the Sender MAC address of the ARP response packet, respectively.

The network management apparatus encapsulates the ARP response packet into a unicast proprietary ARP response packet. The proprietary ARP response packet is sent to core1 hop-by-hop. Core1 receives the proprietary ARP response packet, performs routing forwarding according to the destination IP address of the IP header of the proprietary ARP response packet, and modifies the source MAC address and the destination MAC address of the Ethernet header of the proprietary ARP response packet, wherein the source MAC address and the destination MAC address respectively are replaced with the MAC address 00-E0-FC-11-11-11 of the gateway of VLAN1 and the MAC address 00-5F-AA-95-82-07 of leaf1. Core1 searches out an entry (shown in the second row of Table 3.3) according to the destination MAC address 00-5F-AA-95-82-07 of the Ethernet header of the proprietary ARP response packet, performs Trill encapsulation for the proprietary ARP response packet, and sends to leaf1 the Trill-encapsulated proprietary ARP response packet within the Trill domain.

Leaf1 receives the Trill-encapsulated proprietary ARP response packet, removes the outer Ethernet header and the Trill header, removes the Ethernet header and the IP header of the proprietary ARP response packet, and configures the Sender MAC address ED-01-00-03-00-02 and the Target MAC address ED-01-00-01-00-01 of the ARP response packet as the source MAC address and the destination MAC address of the ARP response packet, respectively.

In this case, leaf1 searches out an entry (shown in the fourth row of Table 3.1) that does not include a mapped MAC address based on the source MAC address ED-01-00-03-00-02 of the ARP response packet. Leaf1 replaces, according to a configured Layer 2 forwarding entry (shown in the third row of Table 3.1), the destination MAC address ED-01-00-01-00-01 of the Ethernet header of the ARP response packet with a mapped MAC address 00-11-11-11-11-11 corresponding to the destination MAC address, and sends the ARP response packet to the source VM via Port1. Leaf1 forwards to the source VM the ARP response packet. The source VM learns an ARP entry based on the received ARP response packet, wherein the ARP entry records a mapping relationship between the IP address 1.1.1.8 and the virtual MAC address ED-01-00-03-00-02.

It should be noted that an access layer RBridge intercepts an ARP request packet received from a common interface, but does not intercept an ARP request packet received from an interface enabling the Trill protocol. In the VLL2 network, if a L3 interface of a core layer RBridge sends the ARP request packet in a manner of broadcasting to learn the ARP entry of the VM, the above ARP interception mechanism may also be used to control the flooding of the ARP request packet.

For example, the core1, a Layer 3 device in FIG. 1, sends to the network management apparatus a unicast proprietary ARP request packet to request ARP information of all VMs in VLAN1 within the DC.

Alternatively, core1 sends to the network management apparatus the unicast proprietary ARP request packet to request ARP information about a certain VM. Taking the destination VM as an example, core1 sends the proprietary ARP request packet. In the proprietary ARP request packet, the Sender IP address is the IP address of the gateway of VLAN1, the Sender MAC address is the MAC address 00-E0-FC-11-11-11 of the gateway of VLAN1, the Target IP address is 1.1.1.8, and the Target MAC address is 00-00-00-00-00-00. The source IP address of the proprietary ARP request packet is the IP address 1.1.1.30 of the gateway of VLAN1, and the destination IP address of the proprietary ARP request packet is the IP address 122.1.2.1 of the network management apparatus. Core1 encapsulates an Ethernet header changed hop-by-hop outside the IP header. Ultimately, the proprietary ARP request packet is sent to the network management apparatus hop-by-hop.

The network management apparatus searches out, in Table 1, a virtual MAC address ED-01-00-03-00-02 corresponding to the Target IP address 1.1.1.8 of the proprietary ARP request packet, configures the IP address 1.1.1.8 and the virtual MAC address ED-01-00-03-00-02 as the Sender IP address and the Sender MAC address of the proprietary ARP response packet, respectively, and configures the Sender IP address and the Sender MAC address of the received proprietary ARP request packet as the Target IP address and the Target MAC address of the proprietary ARP response packet, respectively. The network management apparatus configures the source IP address of the proprietary ARP response packet as the IP address 122.1.2.1 of the network management apparatus its own, and configures the destination IP address of the proprietary ARP response packet as the IP address 1.1.1.30 of the gateway of VLAN1. In the Ethernet header of the proprietary ARP response packet, the source MAC address is the MAC address of the network management apparatus, and the destination MAC address is a MAC address of a next-hop device to core1. By this way, the proprietary ARP response packet is sent to core1 hop-by-hop, wherein core1 is used as the gateway of VLAN1.

Core1 receives the proprietary ARP response packet, and learns the ARP entry according to the Sender IP address and the Sender MAC address.

As an outer VLAN (e.g., VLAN m) is independent from the Trill network of the DC, cor1 may still learn an ARP entry of a L3 interface of outer VLAN m in accordance with an ARP protocol mechanism.

Therefore, whether the ARP request packet is intercepted or not may be distinguished through the configuration under a VLAN mode and a port mode of the device.

Figure 5:
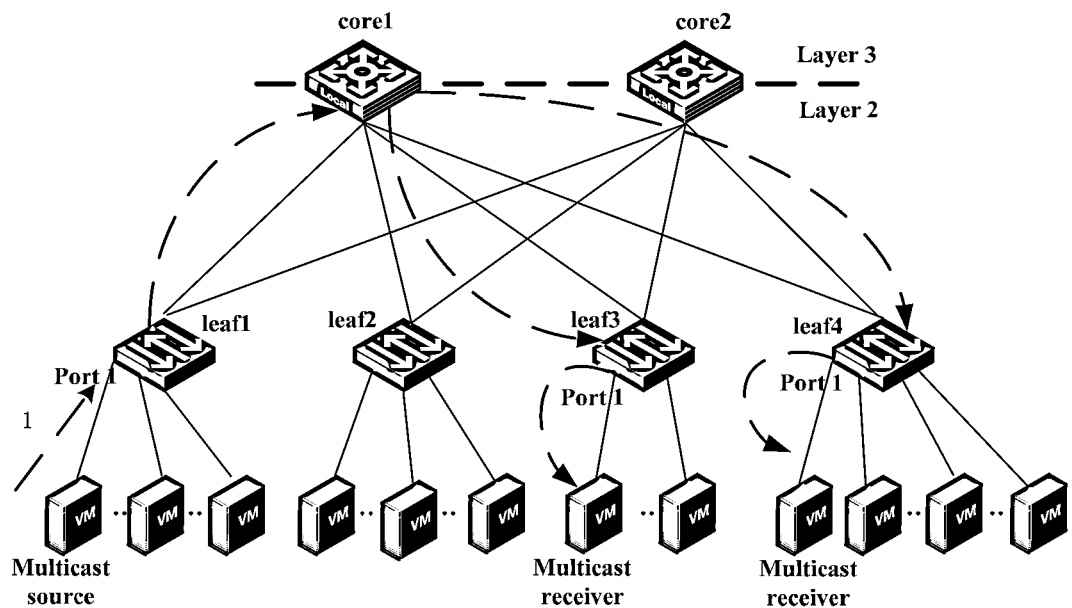
FIG. 5 is a schematic diagram illustrating forwarding a multicast packet according to an example of the present disclosure.

FIG. 5 is a schematic diagram illustrating forwarding a multicast packet according to an example of the present disclosure. In this case, a source VM is a VM connected to port1 of leaf1, and a MAC address of the source VM is 00-11-11-11-11-11.

A Layer 2 forwarding table of leaf1 at least includes entries shown in Table 4.1

TABLE 4.1

| VLAN | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| 1 | 01-00-5E-XX-XX-XX | ff-ff-ff-ff-ff-ff | | DC1_core1 |

A Layer 2 forwarding table of leaf3 at least includes entries shown in Table 4.2

TABLE 4.2

| VLAN | Initial MAC address | Mask | Mapped MAC address | Egress Port |
|---|---|---|---|---|
| VLAN unaware | ED-01-00-01-00-00 | ff-ff-ff-ff-00-00 | | DC1_leaf1 |
| 1 | 01-00-5E-XX-XX-XX | ff-ff-ff-ff-ff-ff | | Port1 |

A Layer 2 forwarding table of leaf4 at least includes entries shown in Table 4.3

TABLE 4.3

| VLAN | Initial MAC address | Mask | Mapped MAC address | Egress Port |
|---|---|---|---|---|
| 1 | 01-00-5E-XX-XX-XX | ff-ff-ff-ff-ff-ff | | Port1 |
| VLAN unaware | ED-01-00-01-00-00 | ff-ff-ff-ff-00-00 | | DC1_leaf1 |

As shown in FIG. 5, the VM as a multicast source sends a multicast packet to leaf1, wherein a source MAC address of the packet is an actual MAC address 00-11-11-11-11-11 of the source VM, a destination MAC address of the packet is a MAC address 01-00-5E-XX-XX-XX of multicast group 1.

Leaf1 receives the multicast packet, searches out an entry (shown in the second row of Table 4.1) based on the source MAC address 00-11-11-11-11-11 of the packet, and replaces the source MAC address with a mapped MAC address ED-01-00-01-00-01 in the entry searched out.

Leaf1 searches out an entry (shown in the fourth row of Table 4.1) according to the destination MAC address 01-00-5E-XX-XX-XX of the Ethernet packet, encapsulates the multicast packet received into a Trill packet based on Dc1_core1 which is an egress port in the entry searched out, and distributes the Trill-encapsulated packet to the Trill network. In other words, a nickname of core1 is a nickname of a root of a multicast tree to which the destination multicast group belongs.

In this operation, leaf1 encapsulates a Trill header for the multicast packet by taking the nickname Dc1_core1 of the egress port as the Egress nickname and taking the nickname Dc1_leaf1 of leaf1 itself as the Ingress Nickname. Leaf1 configures the MAC address of leaf1 and a specific multicast MAC address defined by the Trill as a source MAC address and a destination MAC address of a next-hop header, respectively. Leaf1 forwards the Trill-encapsulated packet to core1 which is the root of the multicast tree to which the multicast group belongs.

Core1 receives the Trill-encapsulated multicast packet, removes the outer Ethernet header and the Trill header, and determines, in a Trill multicast table according to the Egress Nickname of the Trill header, that there are two downstream nodes leaf3 and leaf4 in a multicast forwarding tree of VLAN1. Therefore, the multicast packet is duplicated to get two packets, which respectively are encapsulated into a Trill-encapsulated multicast packet and then sent to the two downstream RBridges leaf3 and leaf4.

Leaf3 and leaf4 respectively receive the Trill-encapsulated multicast packet, decapsulate the packet to obtain the inner multicast packet, and then search, respectively, in the Layer 2 forwarding tables shown in Table 4.2 and Table 4.3 according to the source MAC address ED-01-00-01-00-01 of the Ethernet header of the inner multicast packet. Leaf3 and leaf4 respectively search out an entry (shown in the second row of Table 4.2 and the third row of Table 4.3). These entries do not include a mapped MAC address, so that leaf3 and leaf4 do not replace the source MAC address of the multicast packets. Leaf3 and leaf4 search, according to the multicast MAC address 01-00-5E-XX-XX-XX, in the Layer 2 forwarding tables shown in Table 4.2 and Table 4.3 respectively to obtain corresponding entries (shown in the third row of Table 4.2 and the second row of Table 4.3), and then send the multicast packets via port1 which is the egress port in the entries searched out.

Figure 6:
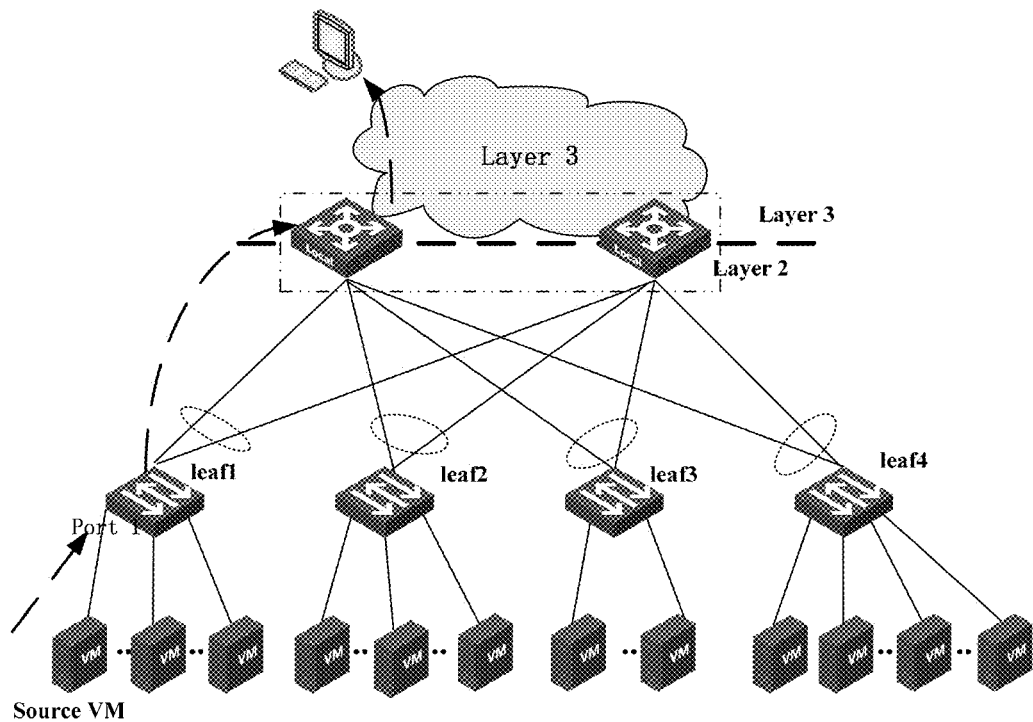
FIG. 6 is a schematic diagram illustrating forwarding a packet in a data center to an outer network according to an example of the present disclosure.

FIG. 6 is a schematic diagram illustrating forwarding a packet in a DC to an outer network according to an example of the present disclosure. In this case, a source VM accesses via port1 of leaf1 in Dc1, and an IP address of the source VM is 1.1.1.1. A destination IP address of a destination end is 172.1.1.1, which is a service IP address of a user rather than IP addresses of tunnels used in the inter-DC Layer 2 connections. A VLAN is VLAN m.

A virtual device formed by core1 and core2 which are on the core layer of Dc1 using the stack protocol is used as a gateway to achieve load balancing and backup. The virtual device is a virtual core layer device. Links of leaf1 used to connect core1 and core2 are bundled by leaf1 into a link aggregation group. Links of leaf2 used to connect core1 and core2 are bundled by leaf2 into a link aggregation group. The same operation is performed by leaf3 and leaf4 also.

Configuration information of core1 and core2 in Dc1 shown in Table 1 is modified in accordance with Table 5.1.

TABLE 5.1

| Device | Nickname | IP Address (MAC over IP) | Port | VLAN | IP address of VM | MAC address of VM | Virtual MAC address of VM | Access device, mask-based, virtual MAC address | Data Center Mask Based virtual MAC Address |
|---|---|---|---|---|---|---|---|---|---|
| core1 | DC1_core | | L3 interface | 1 | 1.1.1.100 | 00-E0-FC-11-11-11 | | | ED-01-00-00-00-00 |

TABLE 5.1-continued

| Device | Nickname | IP Address (MAC over IP) | Port | VLAN | IP address of VM | MAC address of VM | Virtual MAC address of VM | Access device, mask-based, virtual MAC address | Data Center Mask Based virtual MAC Address |
|---|---|---|---|---|---|---|---|---|---|
| | | | L3 interface | 2 | 2.2.2.100 | 00-E0-FC-22-22-22 | | | |
| | | | L3 interface | 3 | 3.3.3.100 | 00-E0-FC-33-33-33 | | | |
| core2 | DC1_core | | L3 interface | 1 | 1.1.1.100 | 00-E0-FC-11-11-11 | | | ED-01-00-00-00-00 |
| | | | L3 interface | 2 | 2.2.2.100 | 00-E0-FC-22-22-22 | | | |
| | | | L3 interface | 3 | 3.3.3.100 | 00-E0-FC-33-33-33 | | | |

Dc1_core is a nickname of the virtual device in the example of the present disclosure. Core2 is a master device of the virtual device.

A Layer 2 forwarding table of leaf1 in FIG. 6 at least includes entries shown in Table 5.2.

TABLE 5.2

| VLAN | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| 1 | 00-E0-FC-11-11-11 | ff-ff-ff-ff-ff-ff | | DC1_core |
| 2 | 00-E0-FC-22-22-22 | ff-ff-ff-ff-ff-ff | | DC1_core |
| 3 | 00-E0-FC-33-33-33 | ff-ff-ff-ff-ff-ff | | DC1_core |

Layer 2 forwarding tables of core1 and core2 at least include entries shown in Table 5.3.

TABLE 5.3

| VLAN | Initial MAC address | Mask | Mapped MAC address | Egress Port |
|---|---|---|---|---|
| 1 | 00-E0-FC-11-11-11 | ff-ff-ff-ff-ff-ff | | L3 |
| 2 | 00-E0-FC-22-22-22 | ff-ff-ff-ff-ff-ff | | L3 |
| 3 | 00-E0-FC-33-33-33 | ff-ff-ff-ff-ff-ff | | L3 |
| VLAN unaware | ED-01-00-01-00-00 | ff-ff-ff-ff-00-00 | | DC1_leaf1 |
| m | Next-hop MAC | ff-ff-ff-ff-ff-ff | | Port m |

As shown in FIG. 6, the source VM sends an Ethernet packet to leaf1, wherein a source MAC address of the packet is 00-11-11-11-11-11 which is an actual source MAC address of the source VM, a destination MAC address of the packet is 00-E0-FC-11-11-11 which is a MAC address of a gateway of VLAN1.

In this operation, the source VM determines that the IP address 1.1.1.1 of its own is not in the same network segment as the IP address 172.1.1.1 of the destination end, and obtain an IP address 1.1.1.100 of the gateway of VLAN1 through querying a local routing table of the source VM (the IP address of the gateway may be configured through a static configuration mode or through a dynamic host configuration protocol mode).

If the source VM does not search out an ARP entry matching the IP address of the gateway of VLAN1, an ARP request packet is broadcasted to request a MAC address corresponding to the IP address 1.1.1.100 of the gateway of VLAN1. The example of the present disclosure does not describe the specific process in further detail.

The MAC address corresponding to the IP address 1.1.1.100 of the gateway of VLAN1 and searched out by the source VM in ARP entries is 00-E0-FC-11-11-11, which is used as a destination MAC address of an Ethernet header.

After receiving the Ethernet packet, leaf1 searches out an entry (shown in the second row of Table 5.2) in the Layer 2 forwarding table according to the source MAC address 00-11-11-11-11-11 of the Ethernet packet, replaces the source MAC address 00-11-11-11-11-11 of the received Ethernet packet with a mapped MAC address ED-01-00-01-00-01 in the entry searched out.

Leaf1 searches out an entry (shown in the fourth row of Table 5.2) in the Layer 2 forwarding table according to the destination MAC address 00-E0-FC-11-11-11 of the Ethernet packet, wherein the entry does not include a corresponding mapped MAC address. Leaf1 encapsulates the received Ethernet packet into a Trill-encapsulated packet according to an Egress nickname (i.e., Dc1_core, which is a nickname of the logical node formed by core1 and core2 in a manner of stacking) of an egress port of the entry searched out.

In this case, leaf1 encapsulate a Trill header by taking Dc1_core (the nickname of the logical node formed by core1 and core2 in a manner of stacking) as the Egress nickname and taking Dc1_leaf1 which is the nickname of leaf1 itself as the Ingress nickname. Leaf1 determines, according to the Till routing table, that a next hop to the Egress Nickname is Dc1_core, searches out a MAC address of Dc1_core in the Trill adjacency table, and encapsulates a next-hop header outside the Trill header. In the next-hop header, a source MAC address is the MAC address of leaf, a destination MAC address is a MAC address of Dc1_core, and a VLAN ID is an identifier of a designated VLAN. Leaf1 forwards the Trill-encapsulated packet to Dc1_core.

The core2, which is the master device of Dc1_core, receives the Trill-encapsulated Ethernet packet, removes the next-hop header and the Trill header, and searches out an entry (shown in the fifth row of Table 5.3) in the Layer 2 forwarding table according to the source MAC address ED-01-00-01-00-01 of the inner Ethernet packet, wherein the entry searched out does not include a mapped MAC address, so that core2 does not replace the source MAC address. Core2 searches out an entry (shown in the second row of Table 5.3)

in the Layer 2 forwarding table according to the destination MAC address 00-E0-FC-11-11-11 of the inner Ethernet packet header, wherein egress port information of the entry searched out is a L3 mark (which indicates the enabling of the Layer 3 forwarding), so that core2 performs the Layer 3 forwarding process including: searching in the routing table a routing entry of the destination IP address 172.1.1.1 to determine a next hop to the destination IP address, querying a MAC address of the next hop, configuring the source MAC address of the Trill-decapsulated Ethernet packet as a MAC address of an interface of VLAN m of the virtual device Dc1_core, and configuring the destination MAC address of the Ethernet packet as the MAC address of the next hop. The packet is forwarded, hop-by-hop within the IP network based on routing, to the destination device of which the IP address is 172.1.1.1.

Similarly, an IP packet sent from the destination device of which the IP address is 172.1.1.1 to the source VM is forwarded hop-by-hop to the virtual device within the IP network.

Specifically, the core1, which is a member device of Dc1_core, receives an Ethernet packet from the outside of the DC. A source MAC address of the Ethernet packet is the MAC address of the next hop learnt by Dc1_core, and a destination MAC address of the Ethernet packet is the MAC address of a L3 interface of VLAN m of Dc1_core. Core1 searches in the Layer 2 forwarding table according to the destination MAC address, and determines to perform the Layer 3 forwarding. Core1 queries the ARP table based on the destination IP address 1.1.1.1 to determine a corresponding MAC address is ED-01-00-01-00-01, configures VLAN1 which is an identifier of a VLAN to which the destination IP address 1.1.1.1 belongs as the VLAN ID of the received Ethernet packet, configures the MAC address searched out according to the ARP table as the destination MAC address of the received Ethernet packet, and configures the MAC address 00-E0-FC-11-11-11 of the gateway of VLAN1 as the source MAC address of the received Ethernet packet.

Core1 searches in the Layer 2 forwarding table according to the source MAC address 00-E0-FC-11-11-11 and the destination MAC address ED-01-00-01-00-01, respectively. The entries searched out by core1 (shown in the second row and the fifth row of Table 5.3) do not include a mapped MAC address. Core1 encapsulates the received Ethernet packet into a Trill packet according to an egress port in the Layer 2 forwarding entry matching the destination MAC address.

Here, the Egress nickname is Dc1_leaf1, and the Ingress nickname is Dc1_core. Core1 determines, according to the Till routing table, that a next hop to the Egress Nickname is leaf1, searches out the MAC address of leaf 1 in the Trill adjacency table, and encapsulates a next-hop header outside the Trill header. In the next-hop header, a source MAC address is the MAC address of Dc1_core1, a destination MAC address is the MAC address of leaf1, a VLAN ID is an identifier of a designated VLAN. Core1 forwards the Trill-encapsulated packet to leaf1.

Figure 7:
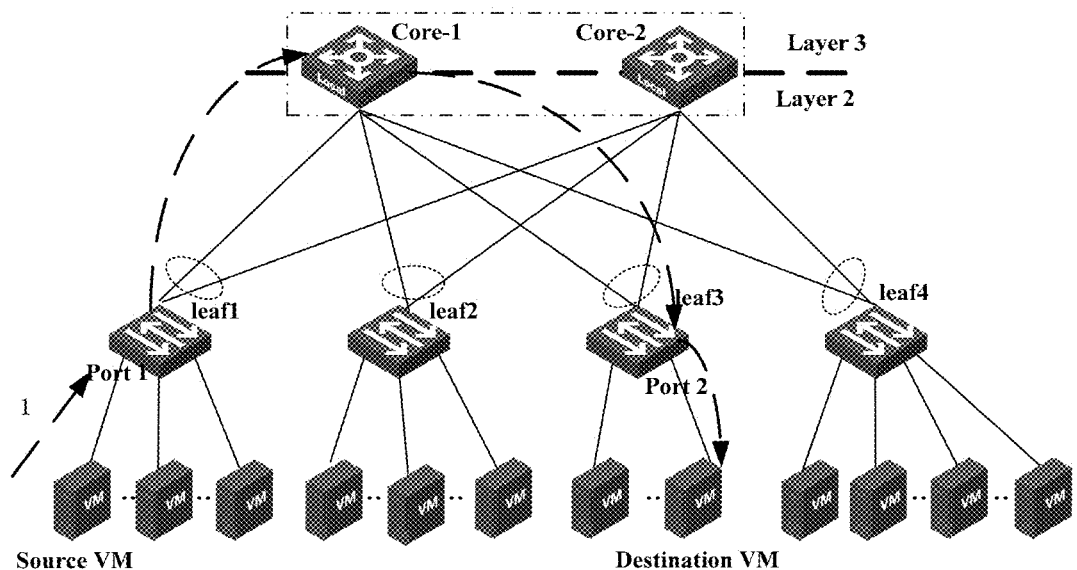
FIG. 7 is a schematic diagram illustrating Layer 3 forwarding within a data center according to an example of the present disclosure.

FIG. 7 is a schematic diagram illustrating Layer 3 forwarding within a DC according to an example of the present disclosure. In this case, a physical server where a source VM is hosted on is connected to port1 of leaf1, an IP address of the source VM is 1.1.1.1, and a VLAN to which the source VM belongs is VLAN1. A physical server where a destination VM is hosted on is connected to port2 of leaf3, an IP address of the destination VM is 2.2.2.7, and a VLAN to which the destination VM belongs is VLAN2.

In FIG. 7, core1 and core2 which are on the core layer of Dc1 form a virtual device in a manner of stacking to achieve load balancing and backup. A nickname of the virtual device is Dc1_core. Core2 is a master device of the virtual device. Links of leaf1 used to connect core1 and core2 are bundled by leaf1 into a link aggregation group. The same operation is performed by leaf2, leaf3 and leaf4 also.

A Layer 2 forwarding table of leaf1 at least includes entries shown in Table 6.1.

TABLE 6.1

| VLAN | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| 1 | 00-E0-FC-11-11-11 | ff-ff-ff-ff-ff-ff | | DC1_core |
| 2 | 00-E0-FC-22-22-22 | ff-ff-ff-ff-ff-ff | | DC1_core |

Layer 2 forwarding tables of core1 and core2 at least include entries shown in Table 6.2.

TABLE 6.2

| VLAN | Initial MAC address | Mask | Mapped MAC address | Egress Port |
|---|---|---|---|---|
| 1 | 00-E0-FC-11-11-11 | ff-ff-ff-ff-ff-ff | | L3 |
| 2 | 00-E0-FC-22-22-22 | ff-ff-ff-ff-ff-ff | | L3 |
| VLAN unaware | ED-01-00-01-00-00 | ff-ff-ff-ff-00-00 | | DC1_leaf1 |
| VLAN unaware | ED-01-00-02-00-00 | ff-ff-ff-ff-00-00 | | DC1_leaf2 |
| VLAN unaware | ED-01-00-03-00-00 | ff-ff-ff-ff-00-00 | | DC1_leaf3 |
| VLAN unaware | ED-01-00-04-00-00 | ff-ff-ff-ff-00-00 | | DC1_leaf4 |

A Layer 2 forwarding table of leaf3 at least includes entries shown in Table 6.3.

TABLE 6.3

| VLAN | Initial MAC address | Mask | Mapped MAC address | Egress Port |
|---|---|---|---|---|
| 1 | 00-E0-FC-11-11-11 | ff-ff-ff-ff-ff-ff | | DC1_core |
| 2 | 00-E0-FC-22-22-22 | ff-ff-ff-ff-ff-ff | | DC1_core |
| 1 | 00-25-9C-2F-63-FE | ff-ff-ff-ff-ff-ff | ED-01-00-03-00-04 | Port1 |
| 1 | ED-01-00-03-00-04 | ff-ff-ff-ff-ff-ff | 00-25-9C-2F-63-FE | Port1 |

As shown in FIG. 7, the source VM sends an Ethernet packet to leaf1. A source MAC address of the packet is 00-11-11-11-11-11 which is an actual MAC address of the source VM, and a destination MAC address of the packet is 00-E0-FC-11-11-11 which is a MAC address of a gateway of VLAN 1.

After receiving the Ethernet packet, leaf1 searches out an entry (shown in the second row of Table 6.1) including a mapped MAC address in the Layer 2 forwarding table according to the source MAC address 00-11-11-11-11-11, and replaces the source MAC address 00-11-11-11-11-11 of the packet with the mapped MAC address ED-01-00-01-00-01.

Leaf1 searches the Layer 2 forwarding table according to the destination MAC address 00-E0-FC-11-11-11 of the packet, and searches out an entry (shown in the fourth row of Table 6.1) that does not include a mapped MAC address. Leaf1 encapsulates the received Ethernet packet into a Trill packet according to Dc1_core which is an egress port of the entry searched out, and sends, according to the Trill routing table, the Trill packet to the Trill network for forwarding.

The core2, which is the master device of Dc1_core, receives the Trill-encapsulated packet, removes the next-hop header and the Trill header, and searches the Layer 2 forwarding table according to the source MAC address ED-01-00-01-00-01 of the inner Ethernet header. An entry (shown in the fourth row of Table 6.2) searched out by core2 does not include a mapped MAC address. Core2 does not replace the source MAC address of the inner Ethernet header.

The core2 searches the Layer 2 forwarding table according to the destination MAC address 00-E0-FC-11-11-11 of the inner Ethernet header. An entry (shown in the second row of Table 6.2) searched out by core2 does not include a mapped MAC address, and egress port information of the entry searched out is L3 attribute. A routing entry of the destination IP address 2.2.2.7 is searched in a routing table of core2, and then a virtual MAC address ED-01-00-03-00-04 corresponding to an IP address of the routing entry is searched out in the ARP table. The VLAN ID of the inner Ethernet packet is changed from VLAN1 to VLAN2, the source MAC address is configured as 00-E0-FC-22-22-22 which is a MAC address of a L3 interface of a gateway of VLAN2, and the destination MAC address of the inner Ethernet header is configured as ED-01-00-03-00-04.

The core2, which is the master device of Dc1_core, searches out, based on the destination MAC address ED-01-00-03-00-04, an entry (shown in the sixth row of Table 6.2) which does not include a mapped MAC address, encapsulates the Ethernet packet into a Trill-encapsulated Ethernet packet according to Dc1_leaf3 which is an egress port of the entry searched out, and sends to leaf3 the Trill-encapsulated Ethernet packet.

After receiving the Trill-encapsulated Ethernet packet, leaf3 removes the Trill header and the next-hop header. Leaf3 searches the Layer 2 forwarding table according to the source MAC address 00-E0-FC-22-22-22 of the Ethernet packet. An entry (shown in the third row of Table 6.3) searched out by leaf3 does not included a mapped MAC address. Leaf3 does not replace the source MAC address. Leaf3 searches out an entry (shown in the last row of Table 6.3) according to the destination MAC address ED-01-00-03-00-04 of the Ethernet packet, wherein the entry searched out includes a mapped MAC address. Leaf3 replaces the destination MAC address ED-01-00-03-00-04 of the Ethernet packet with the mapped MAC address 00-25-9C-2F-63-FE in the entry searched out. Leaf3 forwards to the destination VM the Ethernet packet of which the destination MAC address is replaced through port1 which is an egress port in the entry searched out.

Figure 8:
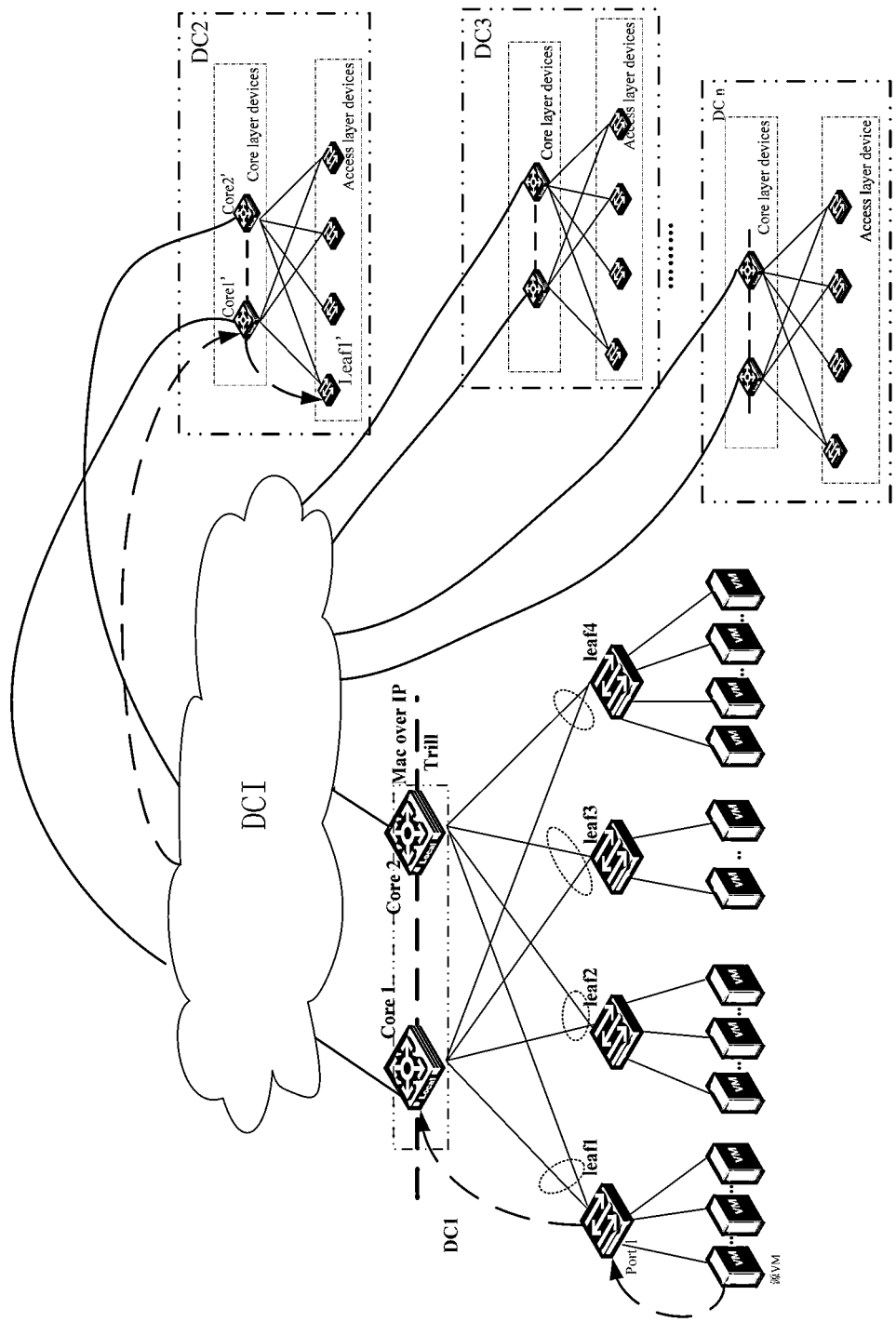
FIG. 8 is a schematic diagram illustrating Layer 2 forwarding between data centers according to an example of the present disclosure.

FIG. 8 is a schematic diagram illustrating Layer 2 forwarding between DCs according to an example of the present disclosure. In the networking, the DC interconnection network employs the MAC over IP technology. Devices of core layer of each DC device support the Trill technology and the MAC over IP technology simultaneously, and support two-way conversion between the Trill and the MAC over IP, i.e., a MAC over IP packet is encapsulated after the Trill is completed, and a Trill packet is encapsulated after the MAC over IP is completed.

In Dc1, core1 and core2 on the core layer form a virtual device (i.e., a logical node) in a manner of stacking to achieve load balancing and backup. A nickname of the virtual device formed by core1 and core2 is Dc1_core. Core2 is a master device of the logical node.

In Dc2, core1' and core2' on the core layer form a virtual device in a manner of stacking to achieve load balancing and backup. A nickname of the virtual device formed by core1' and core2' is Dc2_core. Core1' is a master device of the virtual device.

In this process, a physical server where a source VM is hosted on is connected to leaf1 of Dc1, an IP address of the source VM is 1.1.1.1, and a VLAN to which the source VM belongs is VLAN1. A physical server where a destination VM is hosted on is connected to leaf1' of Dc2, an IP address of the destination VM is 1.1.1.100, and a VLAN to which the destination VM belongs is VLAN1.

A Layer 2 forwarding table of leaf1 at least includes entries shown in Table 7.1.

TABLE 7.1

| VLAN | Initial MAC address | Mask | Mapped MAC address | Egress Port |
|---|---|---|---|---|
| 1 | 00-11-11-11-11-11 | ff-ff-ff-ff-ff-ff | ED-01-00-01-00-01 | Port1 |
| 1 | ED-01-00-01-00-01 | ff-ff-ff-ff-ff-ff | 00-11-11-11-11-11 | Port1 |
| VLAN unaware | ED-02-00-00-00-00 | ff-ff-00-00-00-00 | | DC1_core |

Layer 2 forwarding tables of core1 and core2 at least include entries shown in Table 7.2, respectively.

TABLE 7.2

| VLAN | Initial MAC address | Mask | Mapped MAC address | Egress Port |
|---|---|---|---|---|
| VLAN unaware | ED-01-00-01-00-00 | ff-ff-ff-ff-00-00 | | DC1_leaf1 |
| VLAN unaware | ED-02-00-00-00-00 | ff-ff-00-00-00-00 | | IP2 |

Layer 2 forwarding tables of core1' and core2' at least include entries shown in Table 7.3, respectively.

TABLE 7.3

| VLAN | Initial MAC address | Mask | Mapped MAC address | Egress Port |
|---|---|---|---|---|
| VLAN unaware | ED-01-00-01-00-00 | ff-ff-00-00-00-00 | | IP1 |
| VLAN unaware | ED-02-00-01-00-00 | ff-ff-ff-ff-00-00 | | DC2_leaf1 |

A Layer 2 forwarding table of leaf1' at least includes entries shown in Table 7.4.

TABLE 7.4

| VLAN | Initial MAC address | Mask | Mapped MAC address | Egress Port |
|---|---|---|---|---|
| 1 | ED-02-00-01-00-01 | ff-ff-ff-ff-ff-ff | 00-20-00-20-20-20 | Port1 |
| 1 | 00-20-00-20-20-20 | ff-ff-ff-ff-ff-ff | ED-02-00-01-00-01 | Port1 |
| VLAN unaware | ED-01-00-00-00-00 | ff-ff-00-00-00-00 | | DC2_core |

As shown in FIG. 8, the source VM sends an Ethernet packet to leaf1. A source MAC address of the Ethernet packet is 00-11-11-11-11-11 which is an actual MAC address of the source VM, and a destination MAC address of the Ethernet packet is ED-02-00-01-00-01 which is a virtual MAC address corresponding to the destination IP address.

Leaf1 receives the Ethernet packet, searches out an entry (shown in the second row of Table 7.1) including a mapped MAC address in the Layer 2 forwarding table according to the source MAC address 00-11-11-11-11-11, and replaces the source MAC address of the packet with the mapped MAC address ED-01-00-01-00-01. Leaf1 searches out an entry (shown in the fourth row of Table 7.1) not including a mapped MAC address in the Layer 2 forwarding table according to the destination MAC address ED-02-00-01-00-01, encapsulates the received Ethernet packet into a Trill packet according to Dc1_core which is an egress port of the entry searched out, and sends the Trill packet to an egress device Dc1_core within the Trill network.

The core2, which is the master device of Dc1_core, receives the Trill packet, decapsulates the Trill packet to get the Ethernet packet, and searches out an entry (shown in the second row of Table 7.2) not including a mapped MAC address according to the source MAC address ED-01-00-01-00-01 of the decapsulated Ethernet packet. Core2 does not replace the source MAC address. Core2 searches out an entry (shown in the third row of Table 7.2) not including a mapped MAC address according to the destination MAC address ED-02-00-01-00-01 of the decapsulated Ethernet packet, and performs MAC over IP encapsulation to the decapsulated Ethernet packet based on IP2 which is an egress port in the entry searched out. In the MAC over IP header encapsulated by the core2 for the packet (i.e., an outer IP header), an outer source IP address is IP1, an outer destination IP address is IP2. The core2 performs routing forwarding according to IP2, and encapsulates an Ethernet header changed hop-by-hop outside the outer IP header, so that the packet encapsulated with the MAC over IP is forwarded to Dc2 hop-by-hop through the DC interconnecting (DCI) network.

The core1', which is the master device of Dc2_core, receives the packet encapsulated with the MAC over IP, decapsulates the outer Ethernet header and the outer IP header to get the inner Ethernet packet, and searches out an entry (shown in the second row of Table 7.3) not including a mapped MAC address in the Layer 2 forwarding table according to the source MAC address ED-01-00-01-00-01 of the inner Ethernet header. The core1' does not replace the source MAC address. The core1' searches out an entry (shown in the third row of Table 7.3) not including a mapped MAC address according to the destination MAC address ED-02-00-01-00-01 of the decapsulated Ethernet packet, encapsulates the inner Ethernet packet into a Trill-encapsulated Ethernet packet according to Dc2_leaf1 which is an egress port in the entry, and sends to leaf1 ' the Trill-encapsulated Ethernet packet within the Trill network of Dc2.

Leaf1' receives the Trill-encapsulated packet, removes the next-hop header and the Trill header, searches out an entry (shown in the last row of Table 7.4) not including a mapped MAC address in the Layer 2 forwarding table according to the source MAC address ED-01-00-01-00-01. Leaf1' does not replace the source MAC address. Leaf1' searches out an entry (shown in the second row of Table 7.4) including a mapped MAC address 00-20-00-20-20-20 in the Layer 2 forwarding table according to the destination MAC address ED-02-00-01-00-01, replaces the destination MAC address with the mapped MAC address 00-20-00-20-20-20, and sends to the destination VM the Ethernet packet of which the destination MAC address is replaced through Port1 that is the egress port in the entry.

In the above examples, a mechanism about address hierarchy and masks is introduced into the management of the Layer 2 forwarding table, so that a mask-based Layer 2 forwarding table is achieved, and the number of entries in the Layer 2 forwarding table is greatly reduced. A problem that the number of Layer 2 forwarding entries in a Very Large DC is too great can be effectively solved through reducing the number of the entries in the Layer 2 forwarding table. At the same time, it can be avoided that an actual number of the entries of the Layer 2 forwarding table cannot reach the maximum number of the entries supported by a device when learning MAC addresses.

It should be noted that the examples of the present disclosure are described in detail by taking a format of a virtual MAC address as 6 bytes which are OUI-DC ID-Device ID-host ID, and the masks as a 32-bit access device mask and a 16-bit data center mask. Based on this, a mode for configuring the mask-based Layer 2 forwarding table is described, and packet forwarding processes based on the Layer 2 forwarding table under a variety of scenarios are described also. Another format of the virtual MAC address and corresponding MAC address masks in different hierarchies may be designed according to the principle provided by the examples of the present disclosure, and a mask-based Layer 2 forwarding table and packet forwarding processes based on the Layer 2 forwarding table under a variety of scenarios thereof can also be designed, which should be included in the protection scope of the present disclosure as long as virtual MAC addresses of VMs can be hierarchically aggregated through masks in different hierarchies.

Based on the same technical concept, an example of the present disclosure also provides a network management apparatus, applied to a VLL2 network.

Figure 9A:
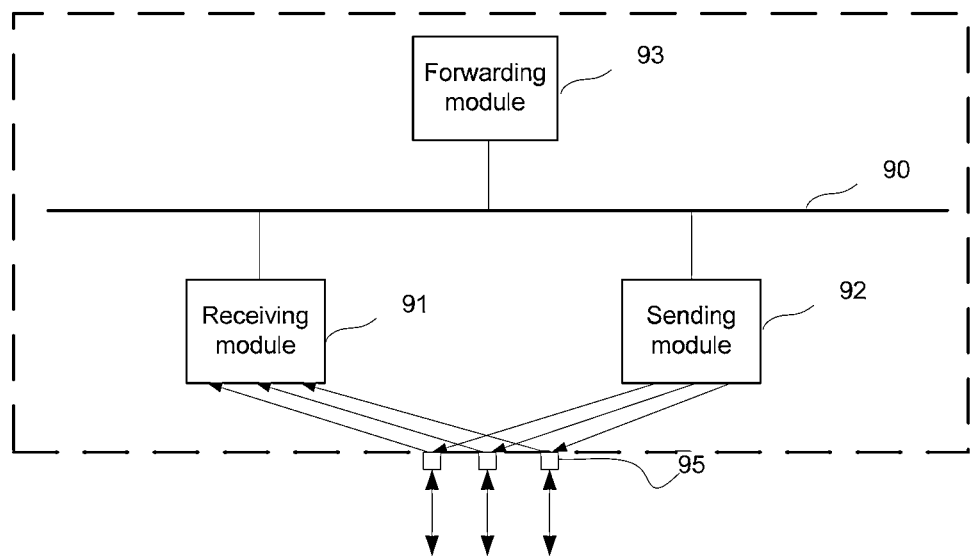
FIG. 9A is a schematic diagram illustrating a structure of a routing switch device according to an example of the present disclosure.
Figure 9B:
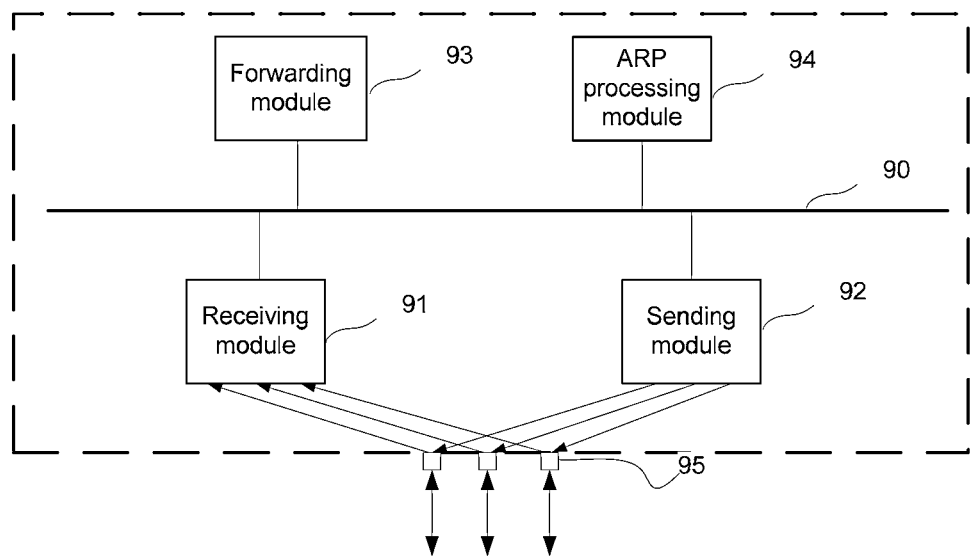
FIG. 9B is a schematic diagram illustrating a structure of a routing switch device according to an example of the present disclosure.

FIG. 9A is a schematic diagram illustrating a structure of the routing switch device according to the example of the present disclosure. An example of the routing switch device is an access layer device. Examples of modules in the routing switch device are shown in FIG. 9A. The modules represent functionalities of the routing switch device which may be implemented in hardware and/or by machine readable instructions executed by a processor or other type of processing circuit. As shown in FIG. 9A, the routing switch device may include a receiving module 91, a sending module 92, a forwarding module 93, and at least one port. The routing switch device may further include an ARP processing module 94, as shown in FIG. 9B. Information communication among the receiving module 91, the sending module 92, the forwarding module 93, and the ARP processing module 94 is performed through a bus 90. The receiving module 91 may receive a packet through the port 94 of the device, and the sending module 92 may send a packet through the port 94 of the device.

Hereinafter, functions of the modules in the routing switch device are described in further detail.

The receiving module 91 is configured to receive an Ethernet packet. The forwarding module 92 is configured to search in a Layer 2 forwarding table according to a source Media Access Control (MAC) address of the Ethernet packet received, and replace, when it is determined that a Layer 2 forwarding entry searched out and matching the source MAC address of the Ethernet packet includes a MAC address mapped to the source MAC address, the source MAC address of the Ethernet packet with the MAC address mapped to the source MAC address; search in the Layer 2 forwarding table according to a destination MAC address of the Ethernet packet received; perform, when it is determined that a Layer 2 forwarding entry searched out and matching the destination MAC address of the Ethernet packet does not include a MAC address mapped to the destination MAC address, Very Large Layer 2 (VLL2) network protocol encapsulation to the Ethernet packet of which the source MAC address is replaced according to an egress port in the Layer 2 forwarding entry matching the destination MAC address. The sending module 93 is configured to send the Ethernet packet encapsulated with a VLL2 network protocol.

Specifically, when the Layer 2 forwarding entry matching the destination MAC address of the Ethernet packet received and searched out by the forwarding module 93 is an access device entry (i.e., identifies an access device) associated with another access layer device in a same data center where the routing switch device receiving the Ethernet packet locates, the forwarding module 93 is configured to perform the VLL2 network protocol encapsulation to the Ethernet packet of which the source MAC address is replaced taking an egress port in the access device entry and towards the other access layer device associated with the access device entry as egress port information in the VLL2 network protocol encapsulation. The sending module 92 is configured to send to the other access layer device the Ethernet packet encapsulated with the VLL2 network protocol through the egress port in the access device entry and towards the other access layer device.

Specifically, when the Layer 2 forwarding entry matching the destination MAC address of the Ethernet packet received and searched out by the forwarding module 93 is a data center entry (i.e., identifies a data center) associated with another data center, the forwarding module 93 is configured to perform the VLL2 network protocol encapsulation to the Ethernet packet of which the source MAC address is replaced taking an egress port in the data center entry and towards the other data center associated with the data center entry as egress port information in the VLL2 network protocol encapsulation. The sending module 92 is configured to send to the other data center the Ethernet packet encapsulated with the VLL2 network protocol through the egress port in the data center entry and towards the other data center.

Specifically, when the Layer 2 forwarding entry matching the destination MAC address of the Ethernet packet received and searched out by the forwarding module 93 is a gateway forwarding entry (i.e., identifies a gateway), the forwarding module 93 is configured to perform the VLL2 network protocol encapsulation to the Ethernet packet of which the source MAC address is replaced taking an egress port in the gateway forwarding entry and towards a gateway as egress port information in the VLL2 network protocol encapsulation. The sending module 92 is configured to send to the gateway the Ethernet packet encapsulated with the VLL2 network protocol through the egress port in the gateway forwarding entry and towards the gateway.

Specifically, when the Ethernet packet received by the receiving module 91 is a multicast packet, the Layer 2 forwarding entry matching the destination MAC address of the Ethernet packet received and searched out by the forwarding module 93 is a multicast forwarding entry (i.e., identifies a multicast address), and an egress port of the multicast forwarding entry includes an egress port towards a root of a multicast tree of a multicast group, the forwarding module 93 is configured to perform the VLL2 network protocol encapsulation to the Ethernet packet of which the source MAC address is replaced taking the egress port in the multicast forwarding entry and towards the root of the multicast tree of the multicast group as egress port information in the VLL2 network protocol encapsulation. The sending module 92 is configured to send to the root of the multicast tree of the multicast group the multicast packet encapsulated with the VLL2 network protocol through the egress port in the multicast forwarding entry and towards the root of the multicast tree of the multicast group.

Specifically, when the Ethernet packet received by the receiving module 91 is a multicast packet, the Layer 2 forwarding entry matching the destination MAC address of the Ethernet packet received and searched out by the forwarding module 93 is a multicast forwarding entry, and an egress port of the multicast forwarding entry includes an egress port towards a multicast receiver, the sending module 92 is configured to send to the multicast receiver the multicast packet of which the source MAC address is replaced through the egress port in the multicast forwarding entry and towards the multicast receiver.

Furthermore, when it is determined that the Layer 2 forwarding entry searched out by the forwarding module 93 and matching the destination MAC address of the Ethernet packet received includes the MAC address mapped to the destination MAC address, the forwarding module 93 is configured to replace the destination MAC address of the Ethernet packet with the MAC address mapped to the destination MAC address. Accordingly, the sending module 92 is configured to send the Ethernet packet of which the source MAC address and the destination MAC address are replaced through the egress port in the Layer 2 forwarding entry matching the destination MAC address.

Furthermore, the receiving module 91 is configured to receive an Ethernet packet encapsulated with the VLL2 network protocol. Accordingly, the forwarding module 93 is configured to decapsulate VLL2 network protocol encapsulation of the Ethernet packet received when it is determined, according to the VLL2 network protocol encapsulation of the Ethernet packet encapsulated with the VLL2 network protocol, that the routing switch device receiving the Ethernet packet encapsulated with the VLL2 network protocol is a destination device of the Ethernet packet encapsulated with the VLL2 network protocol; search in the Layer 2 forwarding table according to a destination MAC address of the decapsulated Ethernet packet; when it is determined that a Layer 2 forwarding entry searched out and matching the destination MAC address of the decapsulated Ethernet packet includes a MAC address mapped to the destination MAC address of the decapsulated Ethernet packet, replace the destination MAC address of the decapsulated Ethernet packet with the MAC address mapped to the destination MAC address of the decapsulated Ethernet packet. The sending module 92 is configured to send the decapsulated Ethernet packet of which the destination MAC address is replaced through an egress port in the Layer 2 forwarding entry matching the destination MAC address of the decapsulated Ethernet packet.

Furthermore, the receiving module 91 is configured to receive an Address Resolution Protocol (ARP) request packet. Accordingly, the ARP processing module 94 is configured to transfer the ARP request packet received into a proprietary ARP request packet; search in the Layer 2 forwarding table according to a source MAC address and a destination MAC address of the proprietary ARP request packet, respectively; when it is determined that a Layer 2 forwarding entry searched out and matching the destination MAC address of the proprietary ARP request packet does not include a MAC address mapped to the destination MAC address of the proprietary ARP request packet, perform the VLL2 network protocol encapsulation to the proprietary ARP request packet according to an egress port in the Layer 2 forwarding entry matching the destination MAC address of the proprietary ARP request packet and towards a gateway within a VLL2 network. The sending module 92 is configured to send the proprietary ARP request packet encapsulated with the VLL2 network protocol through the egress port in the Layer 2 forwarding entry matching the destination MAC address of the proprietary ARP request packet and towards the gateway.

Furthermore, the receiving module 91 is configured to receive a proprietary ARP response packet encapsulated with the VLL2 network protocol. Accordingly, the ARP processing module 94 is configured to decapsulate VLL2 network protocol encapsulation of the proprietary ARP response packet encapsulated with the VLL2 network protocol to obtain a decapsulated ARP response packet, transfer the decapsulated ARP response packet into an ARP response packet with an Ethernet header; search in the Layer 2 forwarding table according to a source MAC address and a destination MAC address of the decapsulated ARP response packet, respectively; when it is determined that a Layer 2 forwarding entry searched out and matching the destination MAC address of the decapsulated ARP response packet includes a MAC address mapped to the destination MAC address of the decapsulated ARP response packet, replace the destination MAC address of the decapsulated ARP response packet with the MAC address mapped to the destination MAC address of the decapsulated ARP response packet. The sending module 92 is further configured to send the decapsulated ARP response packet of which the destination MAC address is replaced through an egress port in the Layer 2 forwarding entry matching the destination MAC address of the decapsulated ARP response packet.

In the above examples, the VLL2 network protocol may be the Transparent Interconnection of Lots of Links (Trill) protocol or the Shortest Path Bridging (SPB) protocol.

The above-mentioned modules in the examples of the present disclosure may be deployed either in a centralized or a distributed configuration; and may be either merged into a single module, or further split into a plurality of sub-modules.

The above-mentioned modules in the examples of the present disclosure may be implemented by software (e.g. machine readable instructions stored in a memory and executable by a processor), hardware (e.g. the processor of an Application Specific Integrated Circuit (ASIC)), or a combination thereof.

Figure 10A:
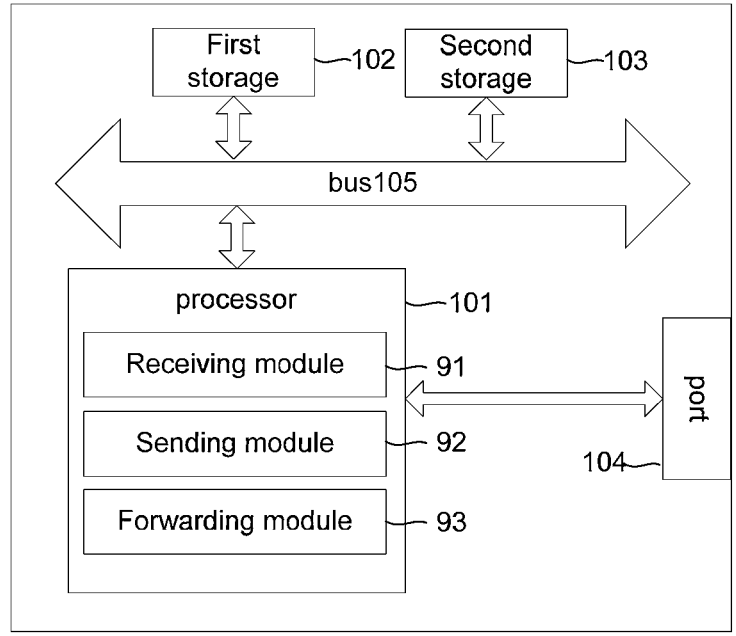
FIG. 10A is a schematic diagram illustrating a hardware structure of a routing switch device according to an example of the present disclosure.
Figure 10B:
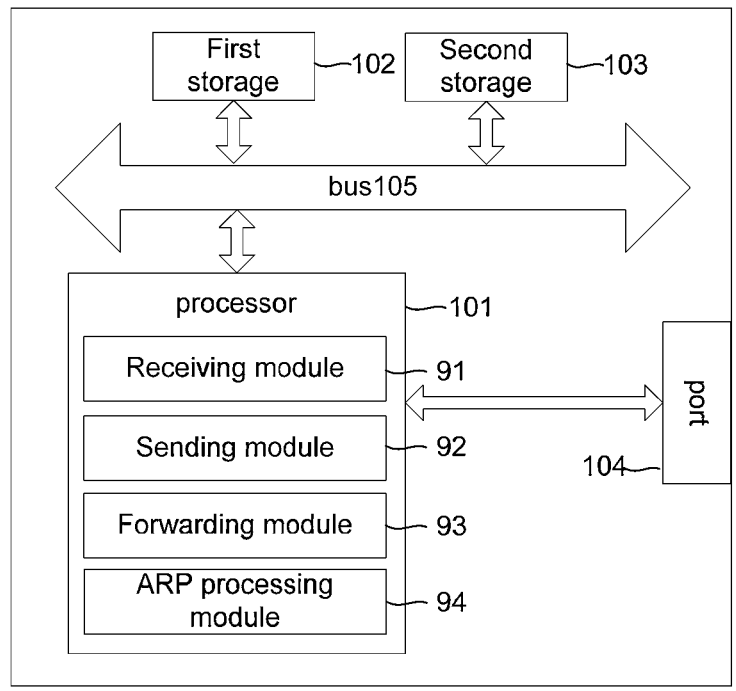
FIG. 10B is a schematic diagram illustrating a hardware structure of a routing switch device according to an example of the present disclosure.

FIG. 10A is a schematic diagram illustrating a hardware structure of the routing switch device according to an example of the present disclosure. As shown in FIG. 10A, the device may include a processor 101, a first storage 102, a second storage 103, at least one port 104, and a bus 105. The processor 101, the first storage 102 and the second storage 103 are interconnected via the bus 105. The routing switch device may receive and send a packet through the port 104. In this case, the first storage 102 is configured to store machine readable instructions; the second storage 103 is configured to store a Layer 2 forwarding table; and the processor 101 is configured to execute machine readable instructions to perform operations described above, including operations of receiving module 91, sending module 92 and forwarding module 93 described with respect to FIGS. 9A-B. FIG. 10B is the same as FIG. 10A except the processor 101 may further execute machine readable instructions for the ARP processing module 94.

The operations performed by processor 101 shown in FIGS. 10A-B may include receiving an Ethernet packet; searching in a Layer 2 forwarding table according to a source Media Access Control (MAC) address of the Ethernet packet received, and replacing the source MAC address with a mapped virtual MAC address in a Layer 2 forwarding entry matching the source MAC address of the Ethernet packet; and searching in the Layer 2 forwarding table according to a destination MAC address of the Ethernet packet received, performing, when it is determined that a Layer 2 forwarding entry matching the destination MAC address of the Ethernet packet does not include a MAC address mapped to the destination MAC address, Very Large Layer 2 (VLL2) network protocol encapsulation to the Ethernet packet of which the source MAC address is replaced according to an egress port in the Layer 2 forwarding entry matching the destination MAC address, and sending the Ethernet packet encapsulated with a VLL2 network protocol.

When the Layer 2 forwarding entry matching the destination MAC address is an access device entry associated with another access layer device in a same data center, the processor is further configured to execute the machine readable instructions to perform operations including: performing the VLL2 network protocol encapsulation to the Ethernet packet of which the source MAC address is replaced, taking an egress port in the access device entry and towards the other access layer device associated with the access device entry as egress port information in the VLL2 network protocol encapsulation, and sending to the other access layer device the Ethernet packet encapsulated with the VLL2 network protocol through the egress port in the access device entry and towards the other access layer device.

When the Layer 2 forwarding entry matching the destination MAC address is a data center entry associated with another data center, the processor is further configured to execute the machine readable instructions to perform operations including:

performing the VLL2 network protocol encapsulation to the Ethernet packet of which the source MAC address is replaced taking an egress port in the data center entry and towards the other data center associated with the data center entry as egress port information in the VLL2 network protocol encapsulation, and sending to the other data center the Ethernet packet encapsulated with the VLL2 network protocol through the egress port in the data center entry and towards the other data center.

When the Layer 2 forwarding entry matching the destination MAC address is a gateway forwarding entry, the processor is further configured to execute the machine readable instructions to perform operations including:

performing the VLL2 network protocol encapsulation to the Ethernet packet of which the source MAC address is replaced taking an egress port in the gateway forwarding entry and towards a gateway as egress port information in the VLL2 network protocol encapsulation, and sending to the gateway the Ethernet packet encapsulated with the VLL2 network protocol through the egress port in the gateway forwarding entry and towards the gateway.

When the Ethernet packet is a multicast packet, the Layer 2 forwarding entry matching the destination MAC address is a multicast forwarding entry, and an egress port of the multicast forwarding entry includes an egress port towards a root of a multicast tree of a multicast group, the processor is further configured to execute the machine readable instructions to perform operations including:

performing the VLL2 network protocol encapsulation to the Ethernet packet of which the source MAC address is replaced taking the egress port in the multicast forwarding entry and towards the root of the multicast tree of the multicast group as egress port information in the VLL2 network protocol encapsulation, and sending to the root of the multicast tree of the multicast group the multicast packet encapsulated with the VLL2 network protocol through the egress port in the multicast forwarding entry and towards the root of the multicast tree of the multicast group.

When the Ethernet packet is a multicast packet, the Layer 2 forwarding entry matching the destination MAC address is a multicast forwarding entry, and an egress port of the multicast forwarding entry includes an egress port towards a multicast receiver, the processor is further configured to execute the machine readable instructions to perform operations including:

sending to the multicast receiver the multicast packet of which the source MAC address is replaced through the egress port in the multicast forwarding entry and towards the multicast receiver.

The processor is further configured to execute the machine readable instructions to perform operations including:

when it is determined that the Layer 2 forwarding entry matching the destination MAC address of the Ethernet packet comprises a mapped actual MAC address, replacing the destination MAC address of the Ethernet packet with the mapped actual MAC address, and sending the Ethernet packet of which the source MAC address and the destination MAC address are replaced through the egress port in the Layer 2 forwarding entry matching the destination MAC address.

The processor is further configured to execute the machine readable instructions to perform operations including:

receiving an Ethernet packet encapsulated with the VLL2 network protocol;

decapsulating VLL2 network protocol encapsulation when it is determined, according to the VLL2 network protocol encapsulation of the Ethernet packet encapsulated with the VLL2 network protocol, that a device receiving the Ethernet packet encapsulated with the VLL2 network protocol is a destination device of the Ethernet packet encapsulated with the VLL2 network protocol;

searching in the Layer 2 forwarding table according to a destination MAC address of the decapsulated Ethernet packet; and when it is determined that a Layer 2 forwarding entry matching the destination MAC address of the decapsulated Ethernet packet comprises a mapped actual MAC address, replacing the destination MAC address of the decapsulated Ethernet packet with the mapped actual MAC address in the Layer 2 forwarding entry matching the destination MAC address of the decapsulated Ethernet packet, and sending the decapsulated Ethernet packet of which the destination MAC address is replaced through an egress port in the Layer 2 forwarding entry matching the destination MAC address of the decapsulated Ethernet packet.

The processor is further configured to execute the machine readable instructions to perform operations including:

receiving an Address Resolution Protocol (ARP) request packet;

transferring the ARP request packet received into a proprietary ARP request packet;

searching in the Layer 2 forwarding table according to a source MAC address and a destination MAC address of the proprietary ARP request packet; and when it is determined that a gateway forwarding entry matching the destination MAC address of the proprietary ARP request packet, performing the VLL2 network protocol encapsulation to the proprietary ARP request packet according to an egress port in the gateway forwarding entry matching the destination MAC address of the proprietary ARP request packet, and sending the proprietary ARP request packet encapsulated with the VLL2 network protocol towards the gateway.

The processor is further configured to execute the machine readable instructions to perform operations including:

receiving a proprietary ARP response packet encapsulated with the VLL2 network protocol;

decapsulating VLL2 network protocol encapsulation to obtain a decapsulated ARP response packet, transferring the decapsulated ARP response packet into an ARP response packet;

searching in the Layer 2 forwarding table according to a source MAC address and a destination MAC address of the ARP response packet;

when it is determined that a Layer 2 forwarding entry matching the destination MAC address of the ARP response packet comprises a mapped actual MAC address, replacing the destination MAC address of the ARP response packet with the mapped actual MAC address in the Layer 2 forwarding entry matching the destination MAC address of the ARP response packet; and sending the ARP response packet of which the destination MAC address is replaced through an egress port in the Layer 2 forwarding entry matching the destination MAC address of the ARP response packet.

In the example of the present disclosure, the VLL2 network protocol may be the Transparent Interconnection of Lots of Links (Trill) protocol or the Shortest Path Bridging (SPB) protocol.

As can be seen from the above description, when the machine readable instructions stored in the first storage 102 are executed by the processor 101, functions of the foregoing receiving module 91, the sending module 92, the forwarding module 93, and the ARP processing module 94 are achieved, as shown in FIG. 10B.

As can be seen from the above description, in the examples of the present disclosure, when forwarding a packet, an access layer device within the VLL2 network matches, in accordance with a Layer 2 forwarding table based on MAC address masks, Layer 2 forwarding entries according to a source MAC address and a destination MAC address of the packet, respectively, replaces, when a virtual MAC address is included in the Layer 2 forwarding entry matched, the corresponding MAC address of the packet with the virtual MAC address; and forwards the packet according to an egress port in the Layer 2 forwarding entry matching the destination MAC address of the packet. Therefore, the packet is forwarded in accordance with the Layer 2 forwarding entry based on the MAC address mask.

In practice, the examples of the present disclosure may be implemented by a hardware ASIC for an Ethernet switch device which requires high processing performance, and may be implemented by machine readable instructions for devices like routers and vswitch which do not require the high processing performance.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.). The processes, methods and functional units may all be performed by a single processor or split between several processors; reference in this disclosure or the claims to a 'processor' should thus be interpreted to mean 'one or more processors'. The processes, methods and functional units be implemented as machine readable instructions executable by one or more processors, hardware logic circuitry of the one or more processors or a combination thereof. Further the teachings herein may be implemented in the form of a software product. The computer software product is stored in a non-transitory storage medium and comprises a plurality of instructions for making a computer apparatus (which can be a personal computer, a server or a network apparatus such as a router, switch, access point etc.) implement the method recited in the examples of the present disclosure.

Those skilled in the art may understand that all or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, wherein the modules or procedure shown in the figures are not necessarily essential for implementing the present disclosure. The modules in the aforesaid examples can be combined into one module or further divided into a plurality of sub-modules.

The above are just several examples of the present disclosure, and are not used for limiting the protection scope of the present disclosure. Any modifications, equivalents, improvements, etc., made under the principle of the present disclosure should be included in the protection scope of the present disclosure.

What is claimed is:

1. A method for forwarding a packet, comprising:
receiving an Ethernet packet;
searching Layer 2 forwarding entries in a Layer 2 forwarding table according to a source Media Access Control (MAC) address of the Ethernet packet;
replacing the source MAC address of the Ethernet packet with a mapped virtual MAC address obtained from a Layer 2 forwarding entry matching the source MAC address of the Ethernet packet;
searching in the Layer 2 forwarding table according to a destination MAC address of the Ethernet packet received,
in response to determining that a Layer 2 forwarding entry matching the destination MAC address of the Ethernet packet does not include a MAC address mapped to the destination MAC address, performing Very Large Layer 2(VLL2) network protocol encapsulation on the Ethernet packet according to an egress port in the Layer 2 forwarding entry matching the destination MAC address, and sending the Ethernet packet encapsulated with a VLL2 network protocol header via the egress port.

2. The method of claim 1, wherein when the Layer 2 forwarding entry matching the destination MAC address is an access device entry associated with another access layer device in a same data center, and the encapsulating of the Ethernet packet of which the source MAC address is replaced comprises determining egress port information including an egress port in the access device entry associated with the another access layer device in the same data center; encapsulating the Ethernet packet of which the source MAC address is replaced based on the egress port in the egress port information;
the sending of the encapsulated Ethernet packet comprises sending the encapsulated Ethernet packet to the another access layer device via the egress port in the egress port information.

3. The method of claim 1, wherein when the Layer 2 forwarding entry matching the destination MAC address is a data center entry associated with another data center, and the encapsulating of the Ethernet packet of which the source MAC address is replaced comprises determining an egress port from the data center entry, and encapsulating the Ethernet packet of which the source MAC address is replaced based on the egress port determined from the data center entry, and
the sending of the encapsulated Ethernet packet comprises sending the encapsulated Ethernet packet via the egress port determined from the data center entry.

4. The method of claim 1, wherein when the Layer 2 forwarding entry matching the destination MAC address is a gateway forwarding entry, and the encapsulating of the Ethernet packet of which the source MAC address is replaced comprises determining an egress port from the gateway forwarding entry, and encapsulating the Ethernet packet of which the source MAC address is replaced based on the egress port determined from the gateway forwarding entry; and
the sending of the encapsulated Ethernet packet comprises sending the encapsulated Ethernet packet via the egress port determined from the gateway forwarding entry.

5. The method of claim 1, wherein when the Ethernet packet is a multicast packet, the Layer 2 forwarding entry matching the destination MAC address is a multicast forwarding entry, and an egress port of the multicast forwarding entry comprises an egress port towards a root of a multicast tree of a multicast group, and the encapsulating of the Ethernet packet of which the source MAC address is replaced comprises determining the egress port towards the root of the multicast tree from the multicast forwarding entry; encapsulating the Ethernet packet of which the source MAC address is replaced based on the egress port determined from the multicast forwarding entry; and the sending of the encapsulated Ethernet packet comprises sending the encapsulated Ethernet packet via the egress port determined from the multicast forwarding entry.

6. The method of claim 1, wherein when the Ethernet packet is a multicast packet, the Layer 2 forwarding entry matching the destination MAC address is a multicast forwarding entry, and an egress port of the multicast forwarding entry comprises an egress port towards a multicast receiver, the method further comprising:
sending to the multicast receiver the multicast packet of which the source MAC address is replaced through the egress port in the multicast forwarding entry and towards the multicast receiver.

7. The method of claim 1, further comprising:
in response to determining that the Layer 2 forwarding entry matching the destination MAC address of the Ethernet packet comprises a mapped actual MAC address, replacing the destination MAC address of the Ethernet packet with the mapped actual MAC address, and sending the Ethernet packet of which the source MAC address and the destination MAC address are replaced through the egress port in the Layer 2 forwarding entry matching the destination MAC address.

8. The method of claim 1, further comprising:
receiving an Ethernet packet encapsulated with the VLL2 network protocol;
decapsulating VLL2 network protocol encapsulation when it is determined, according to the VLL2 network protocol encapsulation of the Ethernet packet encapsulated with the VLL2 network protocol, that a device receiving the Ethernet packet encapsulated with the VLL2 network protocol is a destination device of the Ethernet packet encapsulated with the VLL2 network protocol;
searching in the Layer 2 forwarding table according to a destination MAC address of the decapsulated Ethernet packet; and
in response to determining that a Layer 2 forwarding entry matching the destination MAC address of the decapsulated Ethernet packet comprises a mapped actual MAC address, replacing the destination MAC address of the decapsulated Ethernet packet with the mapped actual MAC address in the Layer 2 forwarding entry matching the destination MAC address of the decapsulated Ethernet packet, and sending the decapsulated Ethernet packet of which the destination MAC address is replaced through an egress port in the Layer 2 forwarding entry matching the destination MAC address of the decapsulated Ethernet packet.

9. The method of claim 1, further comprising:
receiving an Address Resolution Protocol (ARP) request packet;
transferring the ARP request packet received into a proprietary ARP request packet;
searching in the Layer 2 forwarding table according to a source MAC address and a destination MAC address of the proprietary ARP request packet; and
in response to determining that a gateway forwarding entry matches the destination MAC address of the proprietary ARP request packet, performing the VLL2 network protocol encapsulation to the proprietary ARP request packet according to an egress port in the gateway forwarding entry matching the destination MAC address of the proprietary ARP request packet, and sending the proprietary ARP request packet encapsulated with the VLL2 network protocol towards the gateway.

10. The method of claim 1, wherein the VLL2 network protocol is a Transparent Interconnection of Lots of Links (Trill) protocol or a Shortest Path Bridging (SPB) protocol.

11. A routing switch device, comprising:
a first storage, to store machine readable instructions;
a second storage, to store a Layer 2 forwarding table; and
a processor, to execute the machine readable instructions to perform operations to forward packets, the operations comprising:
receiving an Ethernet packet;
searching Layer 2 forwarding entries in a Layer 2 forwarding table according to a source Media Access Control (MAC) address of the Ethernet packet;
replacing the source MAC address of the Ethernet packet with a mapped virtual MAC address obtained from a Layer 2 forwarding entry matching the source MAC address of the Ethernet packet;
searching in the Layer 2 forwarding table according to a destination MAC address of the Ethernet packet;
in response to determining that a Layer 2 forwarding entry matching the destination MAC address of the Ethernet packet does not include a MAC address mapped to the destination MAC address, performing Very Large Layer 2(VLL2) network protocol encapsulation on the Ethernet packet according to an egress port in the Layer 2 forwarding entry matching the destination MAC address, and
sending the Ethernet packet encapsulated with a VLL2 network protocol header via the egress port.

12. The routing switch device of claim 11, wherein when the Layer 2 forwarding entry matching the destination MAC address is an access device entry associated with another access layer device in a same data center, and
the operation of encapsulating of the Ethernet packet of which the source MAC address is replaced comprises determining egress port information including an egress port in the access device entry associated with the another access layer device in the same data center; and encapsulating the Ethernet packet of which the source MAC address is replaced based on the egress port in the egress port information;
the operation of sending the encapsulated Ethernet packet comprises sending the encapsulated Ethernet packet to the another access layer device via the egress port in the egress port information.

13. The routing switch device of claim 11, wherein when the Layer 2 forwarding entry matching the destination MAC address is a data center entry associated with another data center, and
the operation of encapsulating of the Ethernet packet of which the source MAC address is replaced comprises determining an egress port from the data center entry and encapsulating the Ethernet packet of which the source MAC address is replaced based on the egress port determined from the data center entry; and
the operation of sending the encapsulated Ethernet packet comprises sending the encapsulated Ethernet packet via the egress port determined from the data center entry.

14. The routing switch device of claim 11, wherein when the Layer 2 forwarding entry matching the destination MAC address is a gateway forwarding entry, and
the operation of encapsulating of the Ethernet packet of which the source MAC address is replaced comprises determining an egress port from the gateway forwarding entry and encapsulating the Ethernet packet of which the source MAC address is replaced based on the egress port determined from the gateway forwarding entry; and the operation of sending the encapsulated Ethernet packet comprises sending the encapsulated Ethernet packet via the egress port determined from the gateway forwarding entry.

15. The routing switch device of claim 11, wherein when the Ethernet packet is a multicast packet, the Layer 2 forwarding entry matching the destination MAC address is a multicast forwarding entry, and an egress port of the multicast forwarding entry comprises an egress port towards a root of a multicast tree of a multicast group, and the operation of encapsulating of the Ethernet packet of which the source MAC address is replaced comprises determining the egress port towards the root of the multicast tree from the multicast forwarding entry and encapsulating the Ethernet packet of which the source MAC address is replaced based on the egress port determined from the multicast forwarding entry; and the operation of sending the encapsulated Ethernet packet comprises sending the encapsulated Ethernet packet via the egress port determined from the multicast forwarding entry.

16. The routing switch device of claim 11, wherein when the Ethernet packet is a multicast packet, the Layer 2 forwarding entry matching the destination MAC address is a multicast forwarding entry, and an egress port of the multicast forwarding entry comprises an egress port towards a multicast receiver, the processor is further to execute the machine readable instructions to perform operations comprising:

sending to the multicast receiver the multicast packet of which the source MAC address is replaced through the egress port in the multicast forwarding entry and towards the multicast receiver.

17. The routing switch device of claim 11, wherein the processor is further to execute the machine readable instructions to perform operations comprising:

in response to determining that the Layer 2 forwarding entry matching the destination MAC address of the Ethernet packet comprises a mapped actual MAC address, replacing the destination MAC address of the Ethernet packet with the mapped actual MAC address, and sending the Ethernet packet of which the source MAC address and the destination MAC address are replaced through the egress port in the Layer 2 forwarding entry matching the destination MAC address.

18. The routing switch device of claim 11, wherein the processor is further to execute the machine readable instructions to perform operations comprising:

receiving an Ethernet packet encapsulated with the VLL2 network protocol;

decapsulating VLL2 network protocol encapsulation when it is determined, according to the VLL2 network protocol encapsulation of the Ethernet packet encapsulated with the VLL2 network protocol, that a device receiving the Ethernet packet encapsulated with the VLL2 network protocol is a destination device of the Ethernet packet encapsulated with the VLL2 network protocol;

searching in the Layer 2 forwarding table according to a destination MAC address of the decapsulated Ethernet packet; and in response to determining that a Layer 2 forwarding entry matching the destination MAC address of the decapsulated Ethernet packet comprises a mapped actual MAC address, replacing the destination MAC address of the decapsulated Ethernet packet with the mapped actual MAC address in the Layer 2 forwarding entry matching the destination MAC address of the decapsulated Ethernet packet, and sending the decapsulated Ethernet packet of which the destination MAC address is replaced through an egress port in the Layer 2 forwarding entry matching the destination MAC address of the decapsulated Ethernet packet.

19. The routing switch device of claim 11, wherein the processor is further to execute the machine readable instructions to perform operations comprising:

receiving an Address Resolution Protocol (ARP) request packet;

transferring the ARP request packet received into a proprietary ARP request packet;

searching in the Layer 2 forwarding table according to a source MAC address and a destination MAC address of the proprietary ARP request packet; and in response to determining that a gateway forwarding entry matching the destination MAC address of the proprietary ARP request packet, performing the VLL2 network protocol encapsulation to the proprietary ARP request packet according to an egress port in the gateway forwarding entry matching the destination MAC address of the proprietary ARP request packet, and sending the proprietary ARP request packet encapsulated with the VLL2 network protocol towards the gateway.

20. The routing switch device of claim 11, wherein the processor is further to execute the machine readable instructions to perform operations comprising:

receiving a proprietary ARP response packet encapsulated with the VLL2 network protocol;

decapsulating VLL2 network protocol encapsulation to obtain a decapsulated proprietary ARP response packet, transferring the decapsulated proprietary ARP response packet into an ARP response packet;

searching in the Layer 2 forwarding table according to a source MAC address and a destination MAC address of the ARP response packet;

when it is determined that a Layer 2 forwarding entry matching the destination MAC address of the ARP response packet comprises a mapped actual MAC address, replacing the destination MAC address of the ARP response packet with the mapped actual MAC address in the Layer 2 forwarding entry matching the destination MAC address of the ARP response packet; and sending the ARP response packet of which the destination MAC address is replaced through an egress port in the Layer 2 forwarding entry matching the destination MAC address of the ARP response packet.

* * * * *